US005876836A

United States Patent [19]

Imamura et al.

[11] Patent Number: 5,876,836

[45] Date of Patent: Mar. 2, 1999

[54] COMPOSITE THERMAL TRANSFER SHEET

[75] Inventors: Hirokatsu Imamura; Koichi Nakamura; Hirokazu Kaneko, all of Tokyo-to, Japan

[73] Assignee: Dai Nippon Insatsu Kabushiki Kaisha, Tokyo-to, Japan

[21] Appl. No.: 475,933

[22] Filed: Jun. 7, 1995

Related U.S. Application Data

[62] Division of Ser. No. 91,646, Jul. 14, 1993, Pat. No. 5,484, 644, which is a division of Ser. No. 584,246, Sep. 18, 1990, Pat. No. 5,264,279.

[30] Foreign Application Priority Data

| | | | |
|---|---|---|---|
| Sep. 19, 1989 | [JP] | Japan | 1-240747 |
| Dec. 29, 1989 | [JP] | Japan | 1-152877 |
| Dec. 29, 1989 | [JP] | Japan | 1-342971 |
| Dec. 29, 1989 | [JP] | Japan | 1-342973 |
| Jan. 31, 1990 | [JP] | Japan | 2-19323 |
| Aug. 10, 1990 | [JP] | Japan | 2-212510 |

[51] Int. Cl.[6] .......... B32B 7/12

[52] U.S. Cl. .......... 428/195; 428/200; 428/204; 428/206; 428/323; 428/488.4; 428/500; 428/913; 428/914

[58] Field of Search .......... 428/195, 200, 428/204, 206, 323, 488.4, 500, 913, 914

[56] References Cited

U.S. PATENT DOCUMENTS

| | | | |
|---|---|---|---|
| 3,565,612 | 2/1971 | Clark | 96/1 |
| 3,922,438 | 11/1975 | Brown et al. | 428/411 |
| 3,937,414 | 2/1976 | Bank et al. | 117/36.2 |
| 3,975,563 | 8/1976 | Franer et al. | 428/143 |
| 4,041,204 | 8/1977 | Hepher et al. | 428/199 |
| 4,123,309 | 10/1978 | Perrington et al. | 156/234 |
| 4,123,578 | 10/1978 | Perrington et al. | 428/206 |
| 4,157,412 | 6/1979 | Deneau | 428/147 |
| 4,244,605 | 1/1981 | Deneau | 282/27.5 |
| 4,273,602 | 6/1981 | Kosaka et al. | 156/234 |
| 4,315,643 | 2/1982 | Tokunaga et al. | 282/27.5 |
| 4,326,005 | 4/1982 | Reed et al. | 428/201 |
| 4,328,977 | 5/1982 | Ozawa et al. | 282/27.5 |
| 4,374,691 | 2/1983 | Vanden Bergh | 156/234 |
| 4,444,833 | 4/1984 | Moriguchi et al. | 346/204 |
| 4,453,839 | 6/1984 | Findlay et al. | 400/120 |
| 4,454,179 | 6/1984 | Bennett et al. | 428/41 |
| 4,454,194 | 6/1984 | Luebbe, Jr. | 428/323 |
| 4,459,055 | 7/1984 | Asakura et al. | 400/237 |
| 4,461,586 | 7/1984 | Kawanishi et al. | 400/120 |
| 4,463,034 | 7/1984 | Tokunaga et al. | 427/256 |
| 4,470,714 | 9/1984 | Aviram et al. | 400/241.1 |
| 4,474,844 | 10/1984 | Omori et al. | 428/216 |
| 4,476,179 | 10/1984 | Moriguchi et al. | 428/216 |
| 4,477,198 | 10/1984 | Bowlds et al. | 400/120 |
| 4,479,997 | 10/1984 | Masterson et al. | 428/212 |
| 4,491,431 | 1/1985 | Aviram et al. | 400/241.1 |
| 4,491,432 | 1/1985 | Aviram et al. | 400/241.1 |
| 4,492,727 | 1/1985 | Inui | 428/216 |
| 4,500,896 | 2/1985 | Kubo et al. | 346/204 |
| 4,502,065 | 2/1985 | Moriguchi et al. | 346/204 |
| 4,505,975 | 3/1985 | Majima | 428/336 |
| 4,510,206 | 4/1985 | Shuman | 428/488.1 |
| 4,518,645 | 5/1985 | Moriguchi et al. | 428/212 |
| 4,525,722 | 6/1985 | Sachdev et al. | 346/1.1 |
| 4,527,171 | 7/1985 | Takanashi et al. | 346/76 PH |
| 4,533,596 | 8/1985 | Besselman | 428/341 |
| 4,547,088 | 10/1985 | Shattuck | 400/241.1 |
| 4,549,824 | 10/1985 | Sachdev et al. | 400/241.1 |
| 4,555,427 | 11/1985 | Kawasaki et al. | 428/195 |
| 4,559,273 | 12/1985 | Kutsukake et al. | 428/484 |
| 4,564,534 | 1/1986 | Kushida et al. | 427/256 |
| 4,565,737 | 1/1986 | Nishide | 428/321.5 |
| 4,567,113 | 1/1986 | Ohtsu et al. | 428/480 |
| 4,581,278 | 4/1986 | Margerum | 428/200 |
| 4,581,283 | 4/1986 | Tokunaga et al. | 428/216 |
| 4,585,688 | 4/1986 | Nakamura et al. | 428/200 |
| 4,592,946 | 6/1986 | Shuman | 428/200 |
| 4,614,682 | 9/1986 | Suzuki et al. | 428/213 |
| 4,615,938 | 10/1986 | Hotta et al. | 428/323 |
| 4,624,891 | 11/1986 | Sato et al. | 428/321.3 |
| 4,626,256 | 12/1986 | Kawasaki et al. | 8/471 |
| 4,627,997 | 12/1986 | Ide | 428/216 |
| 4,628,000 | 12/1986 | Talvalkar et al. | 428/341 |
| 4,631,232 | 12/1986 | Ikawa et al. | 428/413 |
| 4,650,494 | 3/1987 | Kutsukake et al. | 8/471 |
| 4,661,393 | 4/1987 | Uchiyama et al. | 428/200 |
| 4,670,307 | 6/1987 | Onishi et al. | 427/261 |
| 4,678,701 | 7/1987 | Penington et al. | 428/213 |
| 4,684,561 | 8/1987 | Imai et al. | 428/141 |
| 4,684,563 | 8/1987 | Hayashi et al. | 428/207 |

| | | | |
|---|---|---|---|
| 4,686,549 | 8/1987 | Williams et al. | 503/227 |
| 4,707,707 | 11/1987 | Ohno | 346/76 |
| 4,720,480 | 1/1988 | Ito et al. | 503/227 |
| 4,738,889 | 4/1988 | Suzuki et al. | 428/195 |
| 4,744,685 | 5/1988 | Mecke et al. | 400/241 |
| 4,752,598 | 6/1988 | Yubakami et al. | 503/227 |
| 4,755,432 | 7/1988 | Asano et al. | 428/421 |
| 4,756,633 | 7/1988 | Drees et al. | 400/120 |
| 4,756,963 | 7/1988 | Yamamoto et al. | 728/334 |
| 4,762,432 | 8/1988 | Ueyama et al. | 400/241.1 |
| 4,769,258 | 9/1988 | Kobayashi et al. | 427/146 |
| 4,775,578 | 10/1988 | Hayashi et al. | 428/216 |
| 4,784,905 | 11/1988 | Suzuki et al. | 428/321.3 |
| 4,792,495 | 12/1988 | Taniguchi et al. | 428/484 |
| 4,812,439 | 3/1989 | Ohara et al. | 503/227 |
| 4,820,686 | 4/1989 | Ito et al. | 503/227 |
| 4,820,687 | 4/1989 | Kawasaki et al. | 503/227 |
| 4,826,747 | 5/1989 | Chiba et al. | 430/54 |
| 4,833,021 | 5/1989 | Shimura et al. | 428/336 |
| 4,837,200 | 6/1989 | Kondo et al. | 503/227 |
| 4,847,237 | 7/1989 | Vanderzarden | 503/227 |
| 4,865,901 | 9/1989 | Ohno et al. | 428/212 |
| 4,865,913 | 9/1989 | Takeuchi et al. | 428/321.3 |
| 4,870,049 | 9/1989 | Yamamoto et al. | 503/217 |
| 4,877,681 | 10/1989 | Handa et al. | 428/336 |
| 4,880,324 | 11/1989 | Sato et al. | 400/241 |
| 4,880,686 | 11/1989 | Yaegashi et al. | 428/212 |

FOREIGN PATENT DOCUMENTS

| | | |
|---|---|---|
| 55-21289 | 2/1980 | Japan . |
| 55-42824 | 3/1980 | Japan . |
| 56-98178 | 8/1981 | Japan . |
| 56-121791 | 9/1981 | Japan . |
| 56-126194 | 10/1981 | Japan . |
| 57-43898 | 3/1982 | Japan . |
| 59-214695 | 12/1984 | Japan . |
| 60-165283 | 8/1985 | Japan . |
| 60-193694 | 10/1985 | Japan . |
| 1258989 | 10/1989 | Japan . |
| 276769 | 3/1990 | Japan . |
| 2147291 | 6/1990 | Japan . |
| 2206573 | 6/1990 | Japan . |
| 2182489 | 7/1990 | Japan . |
| 2182490 | 7/1990 | Japan . |
| 2184495 | 7/1990 | Japan . |

*Primary Examiner*—Marie Yamnitzky
*Attorney, Agent, or Firm*—Ladas & Parry

[57] ABSTRACT

When a temporary adhesive layer for peelably bonding a transfer-receiving material to a thermal transfer sheet comprising a substrate film and a heat-fusible ink layer disposed on one side thereof is caused to comprise a specific adhesive, an excellent composite thermal transfer material is provided. In such a composite thermal transfer sheet, the thermal transfer sheet is firmly bonded to the transfer-receiving material so as not to cause wrinkles or deviation, both of these members may easily be peeled from each other so that the ink layer is exactly transferred to the paper in a transfer region and it is not transferred thereto at all in a non-transfer region, whereby the transfer-receiving material is not contaminated. An antistatic treatment provides a composite thermal transfer sheet causing no trouble due to charging at the time of or after printing operation. When at least one end portion of a sheet-type composite thermal transfer sheet is fixed, there is provided a composite thermal transfer sheet wherein unintended peeling is prevented.

14 Claims, 6 Drawing Sheets

COMPOSITE THERMAL TRANSFER SHEET

This is a divisional of application Ser. No. 08/091,646 filed on Jul. 14, 1993 now U.S. Pat. No. 5,484,644, which is a divisional of application Ser. No. 07/584,246 filed on Sep. 18, 1990 now U.S. Pat. No. 5,264,279.

FIELD OF THE INVENTION AND RELATED ART

The present invention relates to a composite thermal transfer sheet, and, ore particularly to a co-winding type composite thermal transfer sheet wherein a thermal transfer sheet is temporarily bonded to a transfer-receiving material such as paper and, a sheet-type composite thermal transfer sheet.

Hitherto, in a case where output from a computer or word processor is printed by a thermal transfer system, there has been used a thermal transfer sheet comprising a substrate film and a heat-fusible ink layer disposed on one surface side thereof.

Such a conventional thermal transfer sheet comprises a substrate film comprising a paper having a thickness of 10 to 20 $\mu$m such as capacitor paper and paraffin paper, or comprising a plastic film having a thickness of 3 to 20 $\mu$m such as polyester film and cellophane film. The above-mentioned thermal transfer sheet has been prepared by coating the substrate film with a heat-fusible ink comprising a wax and a colorant such as dye or pigment mixed therein, to form a heat-fusible ink layer on the substrate film.

When printing is effected on a transfer receiving material by using such a conventional thermal transfer sheet, the thermal transfer sheet is supplied from a roll thereof, while a continuous or sheet-like transfer-receiving material is also supplied, so that the former and the latter are superposed on each other on a platen. Then, in such a state, heat is supplied to the thermal transfer sheet from the back side surface thereof by means of a thermal head to melt and transfer the ink layer, whereby a desired image is formed.

However, even when the above-mentioned conventional thermal transfer sheet is as such intended to be used in a facsimile printer using a conventional heat-sensitive color-forming paper, the thermal transfer sheet cannot be used in such a facsimile printer since the above-mentioned recording paper per se develops a color under heating and the facsimile printer does not include a conveying device for a transfer-receiving material. Such a problem is also posed in a special printer such as large plotter.

In order to solve the above-mentioned problem, there has been proposed a method wherein a thermal transfer sheet and a transfer-receiving material are temporarily bonded to each other in advance and wound into a roll form so that the thermal transfer sheet may be adapted to a facsimile printer or the device used therefor may be simplified or miniaturized (Japanese Utility Model Publication No. 2628/1983).

Such a co-winding type composite thermal transfer sheet, is required to have various performances such that the thermal transfer sheet is tightly bonded to the paper so as to provide no wrinkle or deviation, both of these are easily peeled from each other after thermal transfer operation, the ink layer is exactly transferred to the paper in the transfer region, and the ink layer is not transferred to the paper at all in the non-transfer region so that the paper is not contaminated. However, the conventional composite-thermal transfer sheet does not fully satisfy such requirements.

On the other hand, when printing is effected by using such a composite thermal transfer sheet, printing trace remains on the thermal transfer sheet after printing. Therefore, when the printed information is secret, the secret is leaked due to the printing trace of the used thermal transfer sheet.

Further, in the case of the co-winding type composite thermal transfer sheet, both of the thermal transfer film and the transfer-receiving material are discharged from a printer and cut so as to provide an appropriate length thereof. In such a case, the composite thermal transfer sheet is charged due to friction in a period of from the preparation thereof to the use thereof, during conveyance thereof in the printer, and at the time of printing. On the basis of such charging, the resistance of a thermal head is changed at the time of printing, and the thermal head is erroneously driven due to discharge so that the resultant printed letters are disturbed. Further, when the thermal transfer film is peeled from the paper after the discharge thereof from the printer, the thermal transfer film is charged in most cases. Therefore, the peeled thermal transfer film clings to the transfer-receiving material, or a printer, or a desk, clothes, etc., and it is quite troublesome to deal with it.

In general, the thermal transfer film may easily be peeled from the transfer-receiving material. Therefore, in the end portion thereof, the thermal transfer film may easily be peeled from the transfer-receiving material so that it is not suitably fed to the printer, or the thermal transfer film is bent or wrinkled. As a result, there is posed a problem good printed letters cannot be obtained.

Further, in the above-mentioned co-winding type composite thermal transfer sheet, when the transfer-receiving sheet is thick, the diameter of the roll thereof inevitably becomes large and such a roll cannot be housed in a compact printer. From such a viewpoint, there is proposed a sheet-type composite thermal transfer sheet which has been cut into a desired size thereof, such as so-called “A-size” or “B-size” (Japanese Laid-Open Utility Model Application No. 161757/1988, Japanese Laid-Open Patent Application No. 258989/1989). In this case, however, the thermal transfer sheet is very easily peeled from the transfer-receiving material as compared with the co-winding type roll so as to cause some troubles such that the composite sheet is difficult to be fed to a printer, the thermal transfer sheet deviates from the transfer-receiving material at the time of printing, either one of them is bent, etc.

SUMMARY OF THE INVENTION

An object of the present invention is to solve the above-mentioned problems and to provide a co-winding type composite thermal transfer sheet which is excellent in bonding property and peeling property, and provides printed letters having a good resolution without ground staining.

Another object of the present invention is to provide a co-winding type composite thermal transfer sheet which is capable of providing two sets of printed letters corresponding to one sheet thereof, and is excellent in bonding property and peeling property, and provides printed letters having a good resolution without ground staining.

A further object of the present invention is to provide a sheet-type composite thermal transfer sheet which is excellent in bonding property and peeling property, and provides printed letters having a good resolution without grounding staining, and is free of troubles of paper feeding and printing.

A further object of the present invention is to provide a co-winding type composite thermal transfer sheet which is excellent in bonding property and peeling property, and provides printed letters having a good resolution without ground staining, and is free of troubles of paper feeding and printing.

A further object of the present invention is to provide a co-winding type composite thermal transfer sheet which is excellent in bonding property and peeling property, and provides printed letters having a good resolution without ground staining, and is free of problems caused by the used thermal transfer film.

A further object of the present invention is to provide a composite thermal transfer sheet which is excellent in long-term storage property, conveying resistance, etc.

A still further object of the present invention is to provide a package of a sheet-type composite thermal transfer sheet which is excellent in moisture resistance.

According to a first aspect of the present invention, there is provided a composite thermal transfer sheet comprising; a thermal transfer sheet comprising a substrate film and a heat-fusible ink layer disposed on one surface side thereof; a transfer-receiving material; and a temporary adhesive layer capable of peelably bonding the heat-fusible ink layer of the thermal transfer sheet to the transfer-receiving material, wherein the temporary adhesive layer comprises adhesive particles having a low glass transition temperature, wax particles and resin particles having a high glass transition temperature.

According to the above-mentioned first aspect of the present invention there is provided a composite thermal transfer sheet wherein the thermal transfer sheet is firmly bonded to the transfer-receiving material so as not to cause wrinkles or deviation, both of these members may easily be peeled from each other so that the ink layer is exactly transferred to the transfer-receiving material in a transfer region and it is not transferred thereto at all in a non-transfer region, whereby the transfer-receiving material is not contaminated.

According to a second aspect of the present invention, there is provided a composite thermal transfer sheet comprising; a thermal transfer sheet comprising a substrate film and a heat-fusible ink layer disposed on one surface side thereof; a transfer-receiving material; and a temporary adhesive layer capable of peelably bonding the heat-fusible ink layer of the thermal transfer sheet to the transfer-receiving material, wherein at least one selected from interface between the respective layers, interiors thereof and surfaces thereof has been subjected to an antistatic treatment.

According to the above-mentioned second aspect of the present invention there is provided a composite thermal transfer sheet which is excellent in bonding property and peeling property, and provides printed letters having a good resolution without ground staining, and is free of troubles of sheet feeding and printing.

According to a third aspect of the present invention, there is provided a composite thermal transfer sheet comprising; a thermal transfer sheet comprising a substrate film and a heat-fusible ink layer disposed on one surface side thereof; a transfer-receiving material; and a temporary adhesive layer capable of peelably bonding the heat-fusible ink layer of the thermal transfer sheet to the transfer-receiving material, wherein the temporary adhesive layer comprises adhesive particles having a low glass transition temperature, wax particles and resin particles having a high glass transition temperature, and at least one selected from interfaces between the respective layers, interiors thereof and surfaces thereof has been subjected to an antistatic treatment.

According to the above-mentioned third aspect of the present invention, there is provided a composite thermal transfer sheet, wherein the thermal transfer sheet is firmly bonded to the transfer-receiving material so as not to cause wrinkles or deviation, both of these members may easily be peeled from each other so that the ink layer is exactly transferred to the transfer-receiving material in a transfer region and it is not transferred thereto at all in a non-transfer region, whereby the transfer-receiving material is not contaminated, and troubles of sheet feeding and printing are obviated.

According to a fourth aspect of the present invention, there is provided a composite thermal transfer sheet comprising; a thermal transfer sheet comprising a substrate film and a heat-fusible ink layer disposed on one surface side thereof; a transfer-receiving material; and a temporary adhesive layer capable of peelably bonding the heat-fusible ink layer of the thermal transfer sheet to the transfer-receiving material, wherein the temporary adhesive layer comprises a wax and an adhesive resin having a low glass transition temperature.

According to the above-mentioned fourth aspect of the present invention, there is provided a composite thermal transfer sheet wherein the thermal transfer sheet is firmly bonded to the transfer-receiving material so as not to cause wrinkles or deviation, both of these members may easily be peeled from each other so that the ink layer is exactly transferred to the transfer-receiving material in a transfer region and it is not transferred thereto at all in a non-transfer region, whereby the transfer-receiving material is not contaminated.

According to a fifth aspect of the present invention, there is provided a composite-thermal transfer sheet comprising; a thermal transfer sheet comprising a substrate film and two heat-fusible ink layers disposed on both sides thereof; a set of transfer-receiving materials; and temporary adhesive layers capable of peelably bonding each of the heat-fusible ink layers of the thermal transfer sheet to the corresponding transfer-receiving materials.

According to the above-mentioned fifth aspect of the present invention, two printed matters are simultaneously provided corresponding to one printing operation.

According to a sixth aspect of the present invention, there is provided a composite thermal transfer sheet comprising: a sheet-type thermal transfer sheet comprising a substrate film and a heat-fusible ink layer disposed on one surface side thereof; a transfer-receiving material having substantially the same size as that of the sheet-type thermal transfer sheet; and a temporary adhesive layer capable of peelably bonding the heat-fusible ink layer of the thermal transfer sheet to the transfer-receiving material, wherein the thermal transfer sheet is fixed to the transfer-receiving material on at least one of the end portions thereof.

According to the above-mentioned sixth aspect of the present invention, there is provided a sheet-type composite thermal transfer sheet whereby unintended peeling is prevented, paper-feeding to a printer is facilitated, and various troubles in the printer are prevented.

According to a seventh aspect of the present invention, there is provided a composite thermal transfer sheet comprising: a thermal transfer sheet comprising a substrate film and a heat-fusible ink layer disposed on one surface side thereof; a transfer-receiving material; and a temporary adhesive layer capable of peelably bonding the heat-fusible ink layer of the thermal transfer sheet to the transfer-receiving material, wherein the thermal transfer sheet is fixed to the transfer-receiving material at the end portion of the outside of a roll of the thermal transfer sheet.

According to the above-mentioned seventh aspect of the present invention there is provided a co-winding type composite thermal transfer sheet which is excellent in bonding property and peeling property, and provides printed letters having a good resolution without ground staining, and is free of troubles of paper feeding and printing.

According to an eighth aspect of the present invention, there is provided a composite thermal transfer sheet comprising: a thermal transfer sheet comprising a substrate film and a heat-fusible ink layer disposed on one surface side thereof; a transfer-receiving material; and a temporary adhesive layer capable of peelably bonding the heat-fusible ink layer of the thermal transfer sheet to the transfer-receiving material, wherein the thermal transfer sheet is fixed to a tube for the winding thereof at the end portion of the outside of a roll of the thermal transfer sheet.

According to the above-mentioned eighth aspect of the present invention, the thermal transfer sheet may be wound up simultaneously with the printing operation, and therefore the used thermal transfer sheet is easy to be handled and no problem occurs in secret-keeping.

According to a ninth aspect of the present invention, there is provided a composite thermal transfer sheet comprising: a thermal transfer sheet comprising a substrate film and a heat-fusible ink layer disposed on one surface side thereof; a transfer-receiving material; and a temporary adhesive layer capable of peelably bonding the heat-fusible ink layer of the thermal transfer sheet to the transfer-receiving material, wherein the transfer-receiving material has a rigidity of 20 to 2500 gf/cm.

According to the above-mentioned ninth aspect of the present invention, the thermal transfer sheet is firmly bonded to the transfer-receiving material so as not to cause wrinkles or deviation, both of these members may easily be peeled from each other so that the ink layer is exactly transferred to the transfer-receiving material in a transfer region and it is not transferred thereto at all in a non-transfer region, whereby the transfer-receiving material is not contaminated.

According to a tenth aspect of the present invention, there is provided a package of a composite thermal transfer sheet comprising the composite thermal transfer sheet wound around a cylindrical core into a roll form, a container having openings on both sides and being capable of housing the roll, and a retention member for retaining the roll hung in the container; the composite thermal transfer sheet comprising a thermal transfer sheet comprising a substrate film and a heat-fusible ink layer disposed on one surface side thereof, a transfer-receiving material, and a temporary adhesive layer capable of peelably bonding the heat-fusible ink layer of the thermal transfer sheet to the transfer-receiving material; wherein the inside shape of the cylindrical core has substantially the same shape as that of the opening disposed on both sides of the container, the retention member comprises a flange portion and a projection, and the projection is inserted into the opening of the container and the inside of the cylindrical core.

According to the above-mentioned tenth aspect of the present invention, the co-winding type composite thermal transfer sheet is disposed so as to be hung in package, and transfer of the ink layer due to impact or the weight thereof are prevented.

According to an eleventh aspect of the present invention, there is provided a bag-type package comprising a humidity resistance-imparted bag and a composite thermal transfer sheet housed therein, the composite thermal transfer sheet comprising a sheet-type thermal transfer sheet comprising a substrate film and a heat-fusible ink layer disposed on one surface side thereof, a transfer-receiving material having substantially the same size as that of the sheet-type thermal transfer sheet, and a temporary adhesive layer capable of peelably bonding the heat-fusible ink layer of the thermal transfer sheet to the transfer-receiving material.

According to the above-mentioned eleventh aspect of the present invnetion, the sheet-type composite thermal transfer sheet is housed in a moisture resistance-imparted bag-type container, whereby a problem of curl due to moisture absorption may be solved.

These and other objects, fearures and advantages of the present invention will become more apparent upon a consideration of the following description of the preferred embodiments of the present invention taken in conjunction with the accompanying drawings.

DETAILED DESCRIPTION OF PREFERRED EMBODIMENTS

Hereinbelow, the present invention is specifically described on the basis of preferred embodiments thereof with reference to accompanying drawings.

A first embodiment of the composite thermal transfer sheet according to the present invention is described with reference to FIGS. 1 to 4.

Figure 1:
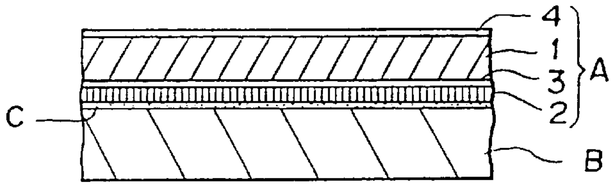
FIG. 1 is a schematic section view of an embodiment of the composite thermal transfer sheet according to the present invention.

FIG. 1 is a schematic sectional view showing the first embodiment of the composite thermal transfer sheet according to the present invention.

Referring to FIG. 1, the composite thermal transfer sheet according to the present invention comprises a thermal transfer sheet A and a transfer-receiving material B peelably bonded to the thermal transfer sheet A by means of a temporary (or provisional) adhesive layer C, wherein the temporary adhesive layer C has a structure as described hereinafter.

As shown in FIG. 1, the thermal transfer sheet A comprises a substrate film 1 and a heat-fusible ink layer 2 disposed thereon. As desired, a mat layer 3 may be disposed between the substrate film 1 and the ink layer 2, and/or a slip layer 4 may be disposed on the back surface of the substrate film 1.

The substrate film 1 to be used in composite thermal transfer sheet according to the present invention may be one selected from those used in the conventional thermal transfer sheet. However, the above-mentioned substrate film 1 is not restricted thereto and can be any of other films.

Preferred examples of the substrate film 1 may include: plastic films such as those comprising polyester, polypropylene, cellophane, polycarbonate, cellulose acetate, polyethylene, polyvinyl chloride, polystyrene, nylon, polyimide, polyvinylidene chloride, polyvinyl alcohol, fluorine-containing resin, chlorinated rubber, and ionomer resin; papers such as capacitor paper and paraffin paper; non-woven fabric; etc. The substrate film 1 can also comprise a combination or composite of the above-mentioned films.

The substrate film 1 may preferably have a thickness of 2 to 25 $\mu$m, while the thickness can appropriately be changed corresponding to the materials thereof so as to provide suitable strength and heat conductivity.

The heat-fusible ink layer to be disposed on the above-mentioned substrate film comprises a colorant and a vehicle. The heat-fusible ink can also contain an optional additive selected from various species thereof, as desired.

The colorant may preferably be one having a good recording property as a recording material, which is selected from organic or inorganic dyes or pigments. For example, the colorant may preferably be one having a sufficient coloring density (or coloring power) and is not substantially faded due to light, heat, temperature, etc.

For the purpose of black mono-color printing, carbon black may naturally be preferred.

For the purpose of multi-color printing, the colorant may be a chromatic colorant such as cyan, magenta, and yellow. It is generally preferred to use about 5 to 70 wt. % of such a colorant in the ink layer.

The vehicle may predominantly comprise a wax or may comprise a mixture of a wax and another component such as drying oil, resin, mineral oil, and derivatives of cellulose and rubber.

Representative examples of the wax may include microcrystalline wax, carnauba wax, paraffin wax, etc. In addition, specific examples of the wax may include; various species thereof such as Fischer-Tropsch wax, various low-molecular weight polyethylene, Japan wax, beeswax, whale wax, insect wax, lanolin, shellac wax candelilla wax, petrolactam, partially modified wax, fatty acid ester, and fatty acid amide. In the present invention, it is also possible to mix a thermoplastic resin having a relatively low melting point in the above-mentioned wax so as to enhance the adhesion property of the ink to a transfer-receiving material.

In order to form the heat-fusible ink layer on the substrate film, there may be used various methods such as hot lacquer coating, gravure coating, gravure reverse coating, roll coating, etc., in addition to hot-melt coating. The ink layer may have a thickness of several microns, which is comparable to hose used in the prior art.

The transfer-receiving material B may be a sheet or film usable for thermal transfer printing which has a rigidity in the range of 20 to 2500 gf/cm.

Specific examples of such a transfer-receiving material may include wood-free paper, plain paper, synthetic paper, tracing paper, plastic film etc., If the rigidity is below the above-mentioned range,, the rigidity of the entire composite thermal transfer sheet becomes insufficient, and the resultant nerve is weak so that the transfer sheet is peeled or wrinkled due to waviness. As a result, the resultant conveying property is seriously impaired and good printing cannot be effected.

On the other hand, if the rigidity exceeds the above range, the resultant thermal transfer sheet becomes uneconomic in view of the thickness, weight, etc., thereof. In a further preferred embodiment, the transfer-receiving material may have a surface smoothness of 50 to 500 sec., and a basis weight of 20 to 500 g/m$^2$ so as to provide better results. The transfer-receiving material may be in a sheet form of A-size or B-size, or a continuous sheet having arbitrary width.

The temporary adhesive layer C temporarily bonding the above-mentioned thermal transfer sheet A to the transfer-receiving material B comprises adhesive particles having a low glass transition temperature, and wax particles and resin particles having a high glass transition temperature. The temporary adhesive layer may preferably have an adhesive strength (or adhesive force) of 300 to 1500 g. Such an adhesive strength may be measured by cutting sample having a width of 25 mm and a length of 55 mm, and subjecting the sample to measurement by means of a sliding friction meter (HEIDON-14, mfd. by Shinto Kagaku K.K.) at a pulling speed of 1800 mm/min. In this range of adhesive strength, the temporary adhesive strength may suitably be set corresponding to various printers.

If the adhesive strength is below the above range, the adhesive strength between the thermal transfer sheet and the transfer-receiving material is insufficient, both of these are liable to be peeled from each other, and the thermal transfer sheet is liable to be wrinkled. If the adhesive strength is above the above range, the adhesive strength is sufficient but the ink layer is liable to be transferred to the transfer-receiving material even in the non-printing region so as to contaminate the transfer-receiving material. The adhesive strength may particularly preferably be in the range of 400 to 800 g.

However, in a case where the thermoplastic resin content in the ink layer is 9 wt. % or higher in terms of solid content in the ink layer, e.g., in the case of ethylene-vinyl acetate copolymer having a vinyl acetate content of 28%, the adhesion between the ink layer and the substrate film is enhanced. Accordingly, even when the adhesive strength of the adhesive layer to the transfer-receiving layer is 800 to 1500 g, there may be obtained a thermal transfer sheet capable of preventing the contamination of the transfer-receiving material. When the adhesive strength is enhanced in such a manner, it may be adapted to a printer which is liable to cause peeling between the substrate film and the transfer-receiving material when the adhesive strength therebetween is insufficient.

Figure 3:
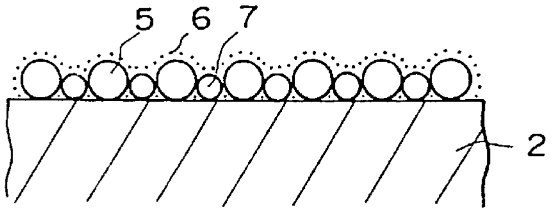
FIG. 3 is a schematic view for illustrating a structure of a temporary bonding layer.

The above-mentioned adhesive particles may preferably have a glass transition temperature of −90° C. to −60° C. Specific examples of such an adhesive may include rubber-type adhesive, acrylic-type adhesive, and silicone-type adhesive. In view of morphology, adhesives may include a solvent-solution type, an aqueous solution-type, hot-melt type, and an aqueous or oily emulsion-type. Each of these types may be used in the present invention, but an adhesive particularly preferably used in the present invention is an acrylic aqueous emulsion-type adhesive having a particle size of about 1 to 30 $\mu$m, more preferably 3 to 20 $\mu$m. When such an emulsion-type adhesive is used, the adhesive 5 constituting the adhesive layer retains particulate form, as shown in FIG. 3.

When the above-mentioned adhesive particles is used alone, excellent adhesion may be provided, but the peelability of the transfer-receiving material is insufficient and uneven. As a result, when an unexpected force is applied to the thermal transfer sheet prior to the thermal transfer operation, e.g., at the time of production, storage, or transportation thereof, the ink layer of the thermal transfer sheet is transferred to the transfer-receiving material to cause ground staining. Further, the cutting of the ink layer is deteriorated at the time of thermal transfer operation, and the ink layer is transferred to the periphery of a region which has been provided with heat by means of a thermal head, whereby the resolution of the transferred image is deteriorated.

In the present invention, however, when an emulsion containing fine resin particles, e.g., resin particles 6 having a particle size of 0.01 to 0.5 $\mu$m, is added to the above-mentioned emulsion adhesive, the adhesion may be regulated to a preferred range thereof, whereby the above-mentioned problem is solved. Further, it has been found that when an emulsion 7 of a wax which is similar to that used in the formation of the ink layer is added, the cutting of the temporary adhesive layer is improved, so that the resolution of the transferred image is remarkably improved.

The above-mentioned resin emulsion may preferably comprise, a thermoplastic resin such as ethylene-vinyl acetate copolymer, ethylene-acrylic acid ester copolymer, polyethylene, polystyrene, polypropylene, polybutene, vinyl chloride resin, vinyl chloride-vinyl acetate copolymer, and acrylic resin. Among these, an acrylic emulsion is particularly preferred. Such resin particles may preferably have a glass transition temperature higher than that of the above-mentioned adhesive (e.g. 60° C. or higher), and can also be heat-cured resin particles in some cases.

The wax emulsion may be obtained by emulsifying the above-mentioned wax by a known method, and the particles size may preferably be as small as possible. However, the wax emulsion usable in the present invention is not restricted to such an emulsion.

The weight ratio among the adhesive, resin particles and wax may preferably be (3 to 5):(1 to 2.5):(3 to 5). If the ratio is not within such a range, various problems may undesirably be posed as described above.

The adhesive layer C comprising the above-mentioned components can be disposed on the surface of the transfer-receiving material B, but a certain adhesiveness remains on the resultant printed matter. Accordingly, the adhesive layer may preferably be disposed on the surface of the ink layer 2 of the thermal transfer sheet. In such a case, since the adhesive is used in the form of an aqueous emulsion, the ink layer is not substantially impaired. The coating method or drying method for the emulsion is not particularly be restricted. However, it is preferred to effect the drying at a low temperature so as to retain particulate form of the emulsion.

The temporary adhesive layer may preferably have a thickness of 0.1 to 20 $\mu$m, i.e., 0.1 to 5 g/m$^2$ in terms of coating amount of solid content.

The surface of the thus prepared temporary adhesive layer C may have a minute unevenness for regulating the adhesion. The minute unevenness may preferably have a depth of 1 to 15 $\mu$m and a pitch of respective unevennesses of about 5 to 50 $\mu$m. If the depth is smaller than 1 $\mu$m, the ink layer is liable to be taken away by the transfer-receiving material side. If the depth exceeds 15 $\mu$m, voids can occur in the resultant transferred image. If the pitch is below 5 $\mu$m, the ink layer is liable to be taken away by the transfer-receiving material side. If the pitch exceeds 50 $\mu$m, the adhesion strength tends to decrease.

The thermal transfer sheet A may preferably be boned to the transfer-receiving material by continuously forming a temporary adhesive layer C on the ink layer of a thermal transfer material while continuously bonding a transfer-receiving material thereto, and winding the resultant laminate into a roll form. At the time of the winding, either one of the transfer-receiving sheet and the thermal transfer sheet may be disposed outside the other. Further, these members may be cut into a sheet form as desired.

Figure 4:
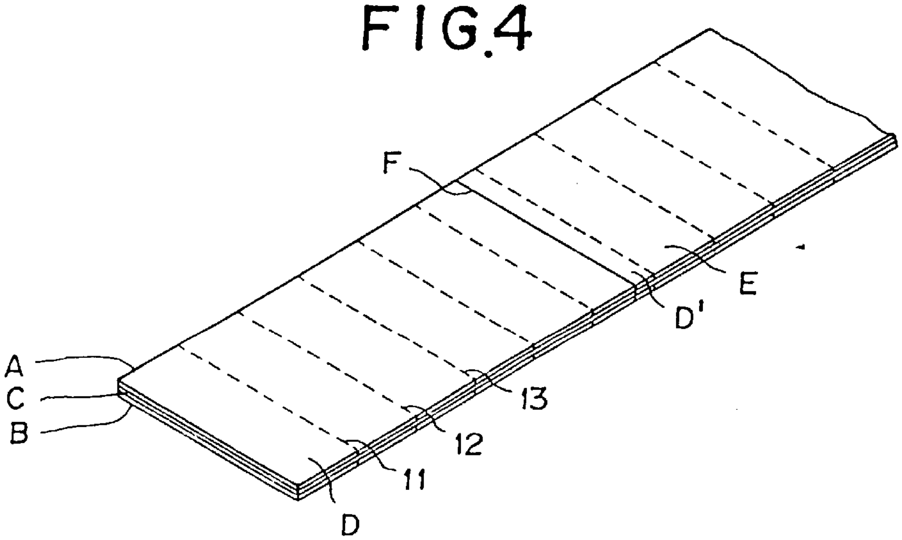
FIG. 4 is a schematic perspective view of an embodiment of the thermal transfer sheet according to the present invention wherein nicks of notches have been formed.

It is also possible to form notches for cutting in the composite thermal transfer sheet according to the present invention. FIG. 4 is a schematic perspective view showing an embodiment of the composite thermal transfer sheet according to the present invention wherein notches have been formed. In the composite thermal transfer sheet, a large number of intermittent notches 11, 12, 13, etc., are formed at intervals of about 5 to 10 cm.

In a case where information is received by means of a facsimile using such a continuous sheet, the address is printed on a head portion D thereof in many cases and information to be communicated is printed in the other portion. In a case where the information communication is completed, the address is recognized by cutting the portion D of the thermal transfer sheet A by use of the notches and peeling it from the other portion thereof. With respect to the other portion, it is sufficient that the receiver per se peels the thermal transfer sheet A. As a matter of course, it is sufficient to peel the thermal transfer sheet only with respect to the portion D, even when the information to be communicated corresponds to plural pages. Next time, a portion E is similarly disposed at the head, and therefore it is sufficient to peel the thermal transfer sheet with respect to the portion E. In some cases, the facsimile paper can be cut at the intermediate portion F between the above-mentioned notches depending on the size of the paper used on the receiver side. In such a case, it is sufficient to peel the thermal transfer sheet A with respect to a piece D' and portion E. In the case of a thermal transfer sheet of a sheet form, the notches may similarly be formed in the portion disposed at a distance of about 5 to 10 cm counted from the head portion thereof.

In the above-mentioned embodiment, notches are entirely formed along the thickness direction of the composite thermal transfer sheet. As a matter of course, the notches may be formed only in the thermal transfer sheet A and no notches may be formed in the transfer-receiving material B.

Hereinabove, a basic structure of the co-winding type composite thermal transfer sheet is described. In the present invention, a technique well known in the field of a thermal transfer sheet may be used in addition to the above-mentioned structure. Specific examples thereof may include: a method wherein a slip layer 4 is disposed on the back surface of the thermal transfer sheet as shown in FIG. 1 so as to prevent the sticking of a thermal head and to improve slip property; a method wherein a mat layer 3 is disposed between the substrate film and the ink layer so as to mat the resultant printed letters; a method wherein the ink layer is caused to have a hue other than black; etc.

In the present invention, it is also possible to dispose a surface layer on the surface of the ink layer 2. The surface layer may comprise a wax having a relatively low melting point selected from those predominantly constituting the vehicle of the ink layer 2. In a case where such a surface layer is disposed, even when relatively coarse-meshed paper is used as a transfer-receiving sheet, the surface layer has a function of sealing the meshes of paper at the time of printing, whereby white dropout, etc., in the printed letters may be prevented.

Such a surface layer may be either colorless, or colored similarly as in the case of the ink layer. In addition, when an adhesive or sticking agent as described hereinafter, such as ethylene-vinyl acetate copolymer resin having a good adhesive property is mixed in the surface layer comprising a wax, the transferability of the ink layer to a transfer-receiving material may further be enhanced.

The above surface layer can be formed by hot-melt coating, etc., similarly as in the case of the ink layer. However, it is preferred to form the surface layer by using an aqueous dispersion containing a wax. It is particularly preferred to apply an aqueous wax dispersion onto the ink layer and dry the resultant coating at a temperature lower than the melting point of the wax. When such a method is used, the surface layer is formed while retaining the particulate form of the wax, and the adhesion property to the transfer-receiving material may be improved.

In the present invention, the surface layer formed in the above manner may preferably have a thickness not smaller than 0.1 $\mu$m and smaller than 5 $\mu$m so that the sensitivity does not become insufficient even when the printing energy is decreased, e.g., in the case of a high-speed printer. When the thickness is below 0.1 $\mu$m, the surface layer does not exhibit the above-mentioned performance.

The slip layer may preferably comprise a binder resin predominantly comprising a styrene-acrylonitrile copolymer, and another optional additive.

The styrene-acrylonitrile copolymer to be used in the present invention may be obtained by co-polymerizing styrene and acrylonitrile. Such a copolymer may easily be prepared in an ordinary manner. In addition, any of commercially available products of various grades can be used in the present invention. Specific examples thereof may include those sold under the trade names of Sebian AD, Sebian LD, and Sebian NA (mfd. by Daiseru Kagaku K.K.).

According to our detailed study, it has been found that among styrene-acrylonitrile copolymers of various grades, it is preferred to use one having a molecular weight of $10\times10^4$ to $20\times10^4$ (more preferably $15\times10^4$ to $19\times10^4$), and/or an acrylonitrile content of 20 to 40 mol % (more preferably 25 to 30 mol %). Such a copolymer may preferably have a softening temperature of 400° C. or higher according to differential thermal analysis, in view of heat resistance and dissolution stability to an organic solvent.

In a case where the substrate film comprises a polyethylene terephthalate film, the adhesion property between the above-mentioned styrene-acrylonitrile copolymer and the substrate film is not necessarily sufficient. Accordingly, in such a case, it is preferred to subject a monomer containing a small amount (e.g., several mol percent) of a functional group (such as methacrylic acid) to copolymerization, at the time of production of the styrene- acrylonitrile copolymer.

Alternatively, it is also possible to use a small amount of another adhesive resin in combination, as to preliminarily form a primer layer on the substrate film by using such an adhesive resin.

The adhesive resin may preferably comprise an amorphous linear saturated polyester resin having a glass transition point of 50° C. or higher. Example of such a polyester resin may include: those sold under trade names of Bairon (mfd. by Toyobo K.K.), Eriter (mfd. by Unitika K.K.), Polyester (mfd. by Nihon Gosei Kagaku K.K.). These resins of various grades are commercially available, and any of these resins can be used in the present invention.

Particularly preferred examples of such a resin may include Bairon RV 290 (mfd. by Toyobo K.K., product containing epoxy groups introduced thereinto, molecular weight=$2.0\times10^4$ to $2.5\times10^4$, Tg=77° C., softening point=180° C., hydroxyl valve=5 to 8).

In a case where the above-mentioned polyester resin is used for forming a primer layer, it is preferred to form the primer layer having a thickness of about 0.05 to 0.5 $\mu$m. If the thickness is too small, the resultant adhesive property may be insufficient. If the thickness is too large, sensitivity to a thermal head or heat resistance may undesirably be lowered.

In a case where the adhesive resin (e.g., polyester resin) is used in a mixture with the above-mentioned styrene-acrylonitrile copolymer, the adhesive resin content may preferably be 1 to 30 wt. parts per 100 wt. parts of the styrene-acrylonitrile copolymer. If the adhesive resin content is too low, the resultant adhesive property may be insufficient. If the adhesive resin content is too high, the heat resistance of the slip layer may be lowered, or sticking may be caused.

As a matter of course, a small amount of another binder resin can also be used in combination within such an extent that the object of the present invention is not substantially impaired.

Specific examples of such a binder resin may include: cellulose resins such as ethylcellulose, hydroxyethyl cellulose, ethyl-hydroxy-ethylcellulose, hydroxypropyl cellulose, methylcellulose, cellulose acetate, cellulose acetate butyrate, and nitrocellulose; vinyl-type resins such as polyvinyl alcohol, polyvinyl acetate, polyvinyl butyral, polyvinyl acetal, polyvinyl pyrrolidone, acrylic resin, polyacrylamide, and acrylonitrile-styrene copolymer; polyester resin, polyurethane resin, silicone-modified or fluorine-modified urethane resin, etc.

In the present invention, when the slip layer is formed by using the above-mentioned materials, an optional additive can be incorporated into the slip layer as long as the object of the present invention is not substantially impaired. Specific examples of such an additive may include; wax, higher fatty acid amide, ester, surfactant, fatty acid metal soap, alkylphosphoric acid ester metal salt, etc.

In order to improve the heat-resistance of the slip layer, it is possible to incorporate a heat-resistance-imparting agent in the slip layer. Specific examples thereof may include: Hydrotalsite DHT-4A (mfd. by Kyowa Kagaku Kogyo), Talcmicroace L-1 (mfd. by Nihon Talc), Taflon Rubron L-2 (mfd. by Daikin Kogyo), Fluorinated Graphite SCP-10 (mfd. by Sanpo Kagaku Kogyo), Graphite AT40S (mfd. by Oriental Sangyo), carbon black, and fine particles such as silica, calcium carbonate, precipitated barium surface, crosslinked urea resin powder, crosslinked melamine resin powder, crosslinked styrene-acrylic resin powder, crosslinked amino resin powder, silicone resin powder, wood meal, molybdenum disulfide, and boron nitride.

The slip layer 4 may be formed by dissolving or dispersing the above-mentioned material in an appropriate solvent such as acetone, methyl ethyl ketone, toluene and xylene to prepare a coating liquid; and applying the coating liquid by an ordinary coating means such as gravure coater, roll coater, and wire bar; and drying the resultant coating.

The coating amount of the slip layer, i.e., the thickness thereof, is also important. In the present invention, a slip layer having sufficient performances may preferably be formed by using a coating amount of 0.5 g/m$^2$ or below, more preferably 0.1 to 0.5 g/m$^2$, based on the solid content thereof. If the slip layer is too thick, the thermal sensitivity at the time of transfer operation may undesirably be lowered.

It is also effective to preliminarily form on the substrate film a primer layer comprising polyester resin, polyurethane resin, etc.

Figure 2:
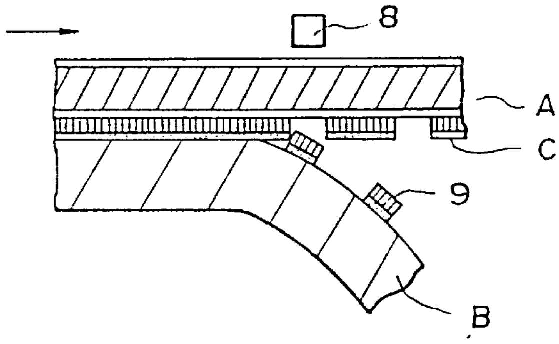
FIG. 2 is a schematic sectional view of a printing state of the composite thermal transfer sheet shown in FIG. 1.

For example, when the above-mentioned composite thermal transfer sheet according to the present invention is set to a facsimile primer, is conveyed as indicate by the allow shown in FIG. 2, printing is effected by means of a thermal head 8, and a transfer-receiving material B is peeled therefrom, a desired image 9 may be formed on the transfer-receiving material B.

EXPERIMENTAL EXAMPLE 1

The first embodiment of the present invention is specifically described with reference to Experiment Examples 1, 2 and 3. In the description appearing hereinafter, "parts" and "%" are those by weight unless otherwise noted specifically.

First, the following ink composition for slip layer was mixed under stirring, and subjected to dispersion treatment for 3 hours by means of a pain shaker, and thereafter an appropriate amount of a diluting solvent (MEK/toluene=1/1) was added to the resultant mixture, whereby an ink for slip layer was prepared. The thus prepared ink was applied onto one surface side of a 6 μm-thick polyester film (Lumirror F-53, mfd. by Toray K.K.) by means of a wire bar coater so as to provide a coating amount of 0.2 g/m$^2$ based on slid content, and then the resultant coating was dried by using hot air to form a slip layer, whereby a substrate film.

Ink Composition for Slip Layer

| | |
|---|---|
| Styrene-acrylonitrile copolymer (Sebian AD, mfd. by Daiseru Kagaku K.K.) | 6.0 parts |
| Linear saturated polyester resin (Eriter UE3200, mfd. by Unitika K.K. | 0.3 part |
| Zinc stearyl phosphate (LBT 1830, mfd. by Sakai Kagaku K.K.) | 3.0 parts |
| Crosslinked urea resin powder (Organic filler, mfd. by Nihon Kasei K.K.) | 3.0 parts |
| Crosslinked malamine resin powder (Epostar-S, mfd. by Nihon Kasei K.K) | 1.5 parts |
| Solvent (MEK/toluene = 1/1) | 86.2 parts |

<Sample 1>

The following ink composition was applied onto the surface of the above-mentioned substrate film not provided with the slip layer so as to provide a coating amount of 4 g/m$^2$, thereby to form an ink layer.

Ink Composition

| | |
|---|---|
| Carbon black | 15 parts |
| Ethylene/vinyl acetate copolymer | 8 parts |
| Paraffin wax | 50 parts |
| Carnauba wax | 25 parts |

(above-mentioned composition was prepared by melt-kneading the above components by means of an attritor at 120° C. for 4 hours).

Then, a temporary adhesive having the following composition (weight ratios were those shown in Table 1 appearing hereinafter) was applied onto the above-mentioned ink layer by a gravure coating method so as to provide a coating amount of 0.5 g/m$^2$ (after drying), thereby to prepare a thermal transfer sheet. Thereafter, plain paper (basis weight=64 g/m$^2$, Bekk surface smoothness=140 sec) was bonded to the thermal transfer sheet by nipping (nip temperature=50° C., nip pressure=500 kg), thereby to prepare a composite thermal transfer sheet (Sample 1) according to the present invention.

Composition of Temporary Adhesive

| | |
|---|---|
| Acrylic adhesive particle aqueous dispersion (solid content = 40%, glass transition temperature = −70° C., particle size = 3 to 10 μm) | 10 parts |
| Acrylic resin particle aqueous dispersion (solid content = 20%, glass transition temperature = 85° C., particle size = 0.2 to 0.3 μm) | 15 parts |
| Carnauba wax aqueous dispersion (solid content = 40%, melting point: = 83° C.) | 15 parts |
| Water | 10 parts |
| Isopropanol | 30 parts |

Samples 2–4

Three species of composite thermal transfer sheets according to the present invention (Samples 2–4) were prepared in the same manner as in Sample 1 by using respective dispersions used in the preparation of Sample 1 except that the composition (weight ratios) of the temporary adhesive was changed to that shown in the following Table 1.

Sample 5

A composite thermal transfer sheet according to the present invention was prepared in the same manner as in Sample 1 except for using an ink composition having the following composition and using a temporary adhesive having the following composition (weight ratios).

Ink Composition

| | |
|---|---|
| Carbon black | 17 parts |
| Ethylene/vinyl acetate copolymer | 10 parts |
| Paraffin wax | 50 parts |
| Carnauba wax | 24 parts |

(above-mentioned composition was prepared by melt-kneading the above components by means of an attritor at 120° C. for 4 hours).

TABLE 1

| | Sample | | | | |
|---|---|---|---|---|---|
| Component | 1 | 2 | 3 | 4 | 5 |
| Adhesive particles | 2 | 1 | 2 | 4 | 2 |
| Resin particles | 1.5 | 1 | 1 | 1 | 1 |
| Wax particles | 3 | 2 | 3 | 4 | 1 |

Comparative Sample 1

A composite thermal transfer sheet of Comparative Example (Comparative Sample 1) was prepared in the same manner as in Sample 1 except that the adhesive particle dispersion used in Sample 1 was used for the temporary adhesive by itself.

Comparative Sample 2

A composite thermal transfer sheet of Comparative Example (Comparative Sample 2) was prepared in the same manner as in Sample 1 except that the adhesive particles and resin particles used in Sample 1 were used for the temporary adhesive in a weight ratio of 1:1.

Comparative Sample 3

A composite thermal transfer sheet of Comparative Example (Comparative Sample 3) was prepared in the same manner as in Sample 1 except that a temporary adhesive layer (thickness=0.5 g/m$^2$) was formed by using polyvinyl alcohol as a temporary adhesive.

Comparative Sample 4

A composite thermal transfer sheet of Comparative Example (Comparative Sample 4) was prepared in the same manner as in Sample 1 except that a temporary adhesive layer (thickness=0.5 g/m$^2$) was formed by using polyurethane-type adhesive as a temporary adhesive.

Then, the adhesions of the above-mentioned respective Samples and Comparative Samples to plain paper were measured. The results are shown in Table 2 appearing hereinafter.

The adhesion states are shown in Table 2 by using the following simbols ○ and x.

○: Two sheets were not easily peeled from each other even after standing. After printing operation, peeling was easily effected by using a fingertip while leaving no ground staining on the paper.

x: Peeling occurred spontaneously after standing, or ground staining, etc., occurred after printing operation.

Based on the above results, it has been found that an adhesion strength of 300 to 1500 g was preferred. In a case where the thermal transfer sheet was used for a printer corresponding to a relatively weak adhesion between the substrate film and transfer-receiving material, it was found that an adhesion of about 400 to 800 g was preferred.

On the other hand, in a case where the thermal transfer sheet was used for a printer requiring a strong adhesion between the substrate film and transfer-receiving material, it was found that an adhesion of about 800 to 1500 g could be obtained by enhancing the adhesion between the substrate film and the transfer-receiving material as in Sample 5. As a result, it was found that the composite thermal transfer sheet according to the present invention could be adapted to various printers.

The adhesion strength between the temporary adhesive layer and the transfer-receiving material was measured by cutting a sample having a width of 25 mm and a length of 55 mm, and subjecting the sample to measurement by means of a sliding friction meter (HEIDON-14, mfd. by Shinto Kagaku K.K.) at a pulling speed of 1800 mm/min.

The printer used for the evaluation in this instance was a letter-size thin film type thermal-head printer which has a platen pressure of 4 kg (full width).

TABLE 2

| | Adhesion | Evaluation | |
|---|---|---|---|
| Sample 1 | 440 | ○ | Good |
| Sample 2 | 310 | Δ | Peeling was somewhat liable to occur |
| Sample 3 | 510 | ○ | Good |
| Sample 4 | 630 | ○ | Good |
| Sample 5 | 1200 | ○ | Good |
| Comparative Sample 1 | above 2000 | X | Ink layer was transferred to the paper |
| Comparative Sample 2 | above 2000 | X | Resolution and ink cutting were poor |
| Comparative Sample 3 | Peeling was easily effected. Moisture resistance was poor.*1 | | |
| Comparative Sample 4 | Initial tackiness was great. Blocking occurred.*1 | | |

*1: The adhesion strength was not measured.

EXPERIMENTAL EXAMPLE 2

<Sample 1>

A composite thermal transfer sheet (Sample 1) which was the same as that of Sample 1 in Experiment Example 1 was prepared by using the same substrate film.

<Sample 2>

A composite thermal transfer sheet according to the present invention (Sample 2) was prepared in the same manner as in Sample 1 of Experiment Example 1 except that adhesive particles having a particle size of 15 to 20 μm were used as those in the dispersion used in Sample 1 of Experiment Example 1.

<Comparative Sample 1>

A composite thermal transfer sheet (Comparative Sample 1) was prepared in the same manner as in Sample 1 of Experiment Example 1 except that particles having a particle size of 0.1 to 0.15 μm were used as the temporary adhesive instead of the acrylic adhesive used in Sample 1 of Experiment Example 1.

Comparative Sample 2>

A composite thermal transfer sheet (Comparative Sample 2) was prepared in the same manner as in Sample 1 of Experiment Example 1 except that particles having a particle size of 40 to 50 μm were used as the temporary adhesive instead of the acrylic adhesive used in Sample 1 of Experiment Example 1.

(In the above-mentioned Comparative Samples, each of the temporary adhesive layers had a thickness of 0.5 g/m$^2$.)

With respect to the above-mentioned respective Samples and Comparative Samples, the adhesions of the thermal transfer sheet to plain paper were measured and the unevenness shape of the temporary adhesive layer was evaluated. The results are shown in Table 3 appearing hereinafter.

The adhesion states are shown in Table 3 by using the following simbols ○ and x.

○: Two sheets were not easily peeled from each other even after standing. After printing operation, peeling was easily effected by using a fingertip while leaving no ground staining on the paper.

x: Peeling occurred spontaneously after standing, or ground staining, etc., occurred after printing operation.

Based on the above results, it has been found that in the unevenness shape of the temporary adhesive layer, a depth of about 1 to 15 μm, and a pitch of about 5 to 50 μm were preferred.

TABLE 3

| | Unevenness shape (μm) | | Evalu- | |
|---|---|---|---|---|
| | Ditch | Depth | ation | |
| Sample 1 | 7–20 | 1–3 | ○ | Good |
| Sample 2 | 20–40 | 7–15 | ○ | Good |
| Comparative Sample 1 | — | 0.01–0.05 | X | Surface of the adhesive layer was smooth. Ink layer was transferred to the paper. |
| Comparative Sample 2 | 60–150 | 20–30 | X | Surface of the adhesive layer was smooth. Peeling occurred easily. Moisture resistance was poor |

EXPERIMENT EXAMPLE 3

<Sample 1>

The following ink composition was applied onto the surface of a substrate film (the same as that used in Experiment Example 1) not provided with the slip layer so as to provide a coating amount of 4 g/m$^2$, thereby to form an ink layer.

Ink Composition

| | |
|---|---|
| Carbon black | 15 parts |
| Ethylene/vinyl acetate copolymer | 8 parts |
| Paraffin wax | 50 parts |
| Carnauba wax | 25 parts |

(The above-mentioned composition was prepared by melt-kneading the above components by means of an attritor at 120° C. for 4 hours).

Then, a temporary adhesive having the following composition (weight ratios were those shown in Table 4 appearing hereinafter) was applied onto the above-mentioned ink layer by a gravure coating method so as to provide a coating amount of 0.5 g/m$^2$ (after drying), thereby to prepare a thermal transfer sheet. Thereafter, plain paper (basis weight=64 g/m$^2$, Bekk surface smoothness=140 secs) was bonded to the thermal transfer sheet by nipping (nip temperature=50° C., nip pressure=500 kg), thereby to prepare a composite thermal transfer sheet according to the present invention.

Composition of Temporary Adhesive

| | |
|---|---|
| Acrylic adhesive particle aqueous dispersion (solid content = 40%, glass transition temperature = −70° C.) | 10 parts |
| Acrylic resin particle aqueous dispersion (solid content = 20%, glass transition (temperature = −85° C., particle size = 0.2 to 0.3 μm) | 15 parts |
| Carnauba wax aqueous dispersion (solid content = 40%, melting point = 83° C.) | 15 parts |
| Water | 10 parts |
| Isopropanol | 30 parts |

Samples 2–4

Three species of composite thermal transfer sheets according to the present invention (Samples 2–4) were prepared in the same manner as in Sample 1 by using respective dispersions used in the preparation of Sample 1 except that the composition (weight ratios) of the temporary adhesive was changed to that shown in the following Table 4, and the rigidity, the basis weight and the surface smoothness of the transfer-receiving material were changed to that shown in the following Table 4.

TABLE 4

| Properties | Sample | | | |
|---|---|---|---|---|
| Component | 1 | 2 | 3 | 4 |
| Rigidity (gf/cm) | 50 | 100 | 1000 | 2300 |
| Basis weight (g/m$^2$) | 64 | 90 | 200 | 480 |
| Surface smoothness (sec) | 140 | 10 | 300 | 450 |
| Adhesive particles | 2 | 1 | 2 | 4 |
| Resin particles | 1.5 | 1 | 1 | 1 |
| Wax particles | 3 | 2 | 3 | 4 |

Comparative Sample 1–2

Two composite thermal transfer sheets of Comparative Example (Comparative Sample 1–2) were prepared in the same manner as in Sample 1 except that the transfer-receiving material having the properties shown in the following Table 5 were used for the transfer-receiving material.

TABLE 5

| | Comparative Sample | |
|---|---|---|
| Properties | 1 | 2 |
| Rigidity (gf/cm) | 15 | 2600 |
| Basis weight (g/m$^2$) | 15 | 650 |
| Surface smoothness (sec) | 2 | 550 |

Then, each of the above-mentioned thermal transfer sheets of Samples 1 to 4 and Comparative Samples 1 to 2 were loaded to a printer (the same as that used in Experiment Example 1) and printing was effected. With respect to the Samples 1 to 4, the thermal transfer sheet was firmly bonded to the transfer-receiving material so as not to cause wrinkles, deviation or any troubles during conveyance thereof in the printer, both of these members were peeled from each other so that the ink layer was exactly transferred to the transfer-receiving material in a transfer region. On the other hand, with respect to Comparative Sample 1, the rigidity of the entire composite thermal transfer sheet was insufficient, and the resultant nerve was weak so that the transfer sheet was peeled or wrinkled due to waviness. As a result, the resultant conveying property was seriously impaired and good printing was not effected. With respect to Comparative Sample 2, though a trouble of the conveying, printing and peeling properties didn't occur, the thickness and weight per one composite thermal transfer sheet was so large that the number of sheets housed in a sheet feed cassette of the printer was insufficient.

Then, a second embodiment of the composite thermal transfer sheet according to the present invention is described with reference to FIG. 5.

Figure 5:
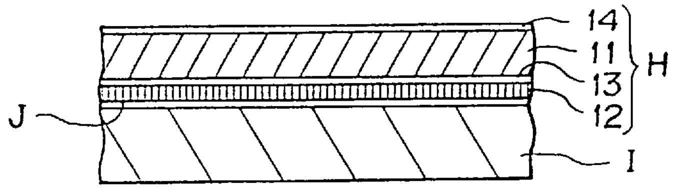
FIG. 5 is a schematic sectional view of another embodiment of the composite thermal transfer sheet according to the present invention.

Referring to FIG. 5, the composite thermal transfer sheet according to the present invention comprises a thermal transfer sheet H and a transfer-receiving material I peelably bonded to the thermal transfer sheet H by means of a temporary (or provisional) adhesive layer J.

As shown in FIG. 5, the thermal transfer sheet H comprises a substrate film 11 and a heat-fusible ink layer 12 disposed thereon. As desired, a mat layer 13 may be disposed between the substrate film 11 and the ink layer 12, and/or a slip layer 14 may be disposed on the back surface of the substrate film 11.

The structure or constitution of such a composite thermal transfer sheet is the same as that of the above-mentioned first embodiment except for the structure of the temporary adhesive layer J. Since the thermal transfer sheet H corresponds to the above-mentioned thermal transfer sheet A and the transfer-receiving material I corresponds to the above-mentioned transfer-receiving material B, explanation of these member is omitted.

The adhesive used in the temporary adhesive layer J comprises a wax and an adhesive resin having a low glass transition temperature. The temporary adhesive layer may preferably have an adhesive strength (or adhesive force) of 800 to 2000 g. Such an adhesive strength may be measured by cutting a sample having a width of 25 mm and a length of 55 mm, and subjecting the sample to measurement by means of a sliding friction meter (HEIDON-14, mfd. by Shinto Kagaku K.K.) at a pulling speed of 1800 mm/min. Such a composite thermal transfer sheet having the above-mentioned temporary adhesive layer J is suitably used for a printer such that it tends to cause peeling during the conveyance of the composite thermal transfer sheet when the adhesion between the thermal transfer sheet H and the transfer-receiving material I is weak. Accordingly, if the adhesive strength is below the above range, the adhesive strength between the thermal transfer sheet and the transfer-receiving material is insufficient, both of these are liable to be peeled from each other, and the thermal transfer sheet is liable to be wrinkled. If the adhesive strength is above the above range, the adhesive strength is sufficient but the ink layer is liable to be transferred to the transfer-receiving material even in the non-printing portion so as to contaminate the transfer receiving material.

When the adhesion strength is set to a value near the upper limit (2000 g), it is preferred to enhance the adhesion of the substrate film 11 to the ink layer 12. In order to obtain such an adhesion strength, it is preferred that the thermoplastic resin content in the ink layer is 9 wt. % or higher in terms of slid content in the ink layer, e.g., when an ethylene-vinyl acetate copolymer having a vinyl acetate content of 28% is used.

The above-mentioned adhesive may preferably have a glass transition temperature of −90° C. to −60° C. Specific examples of such an adhesive may include rubber-type adhesive, acrylic-type adhesive, and silicone-type adhesive. In view of morphology, adhesives may include a solvent-solution type, an aqueous solution-type, hot-melt type, and an aqueous or oily emulsion-type. Each of these types may be used in the present invention, but an adhesive particularly preferably used in the present invention is an acrylic aqueous emulsion-type adhesive.

When the above-mentioned adhesive is used alone, excellent adhesion may be provided, but the peelability of the transfer-receiving material is insufficient and uneven. As a result, when an unexpected force is applied to the thermal transfer sheet prior to the thermal transfer operation, e.g., at the time of production storage, or transportation thereof, the ink layer of the thermal transfer sheet is transferred to the transfer-receiving material to cause ground staining. Further, the cutting of the ink layer is deteriorated at the time of thermal transfer operation, and the ink layer is transferred to the periphery of a region which has been provided with heat by means of a thermal head, whereby the resolution of the transferred image is deteriorated.

In the present invention, however, when an emulsion similar to that used in the formation of the ink layer is added to the above-mentioned emulsion adhesive, the adhesion may be regulated to a preferred range thereof, whereby the above-mentioned problem is solved.

Further, it has been found that when a resin emulsion having a further high glass transition temperature is added the adhesion may be regulated to a preferred range thereof.

The above-mentioned resin emulsion may preferably comprise, a thermoplastic resin such as ethylene-vinyl acetate copolymer, ethylene acrylic acid ester copolymer, polyethylene, polystyrene, polypropylene, polybutene, vinyl chloride resin, vinyl chloride-vinyl acetate copolymer, and acrylic resin. Among these, an acrylic emulsion is particularly preferred. Such resin particles may preferably have a glass transition temperature higher than that of the above-mentioned adhesive (e.g., 60° C. or higher), and can also be heat-cured resin particles in some cases.

The weight ratio between the adhesive resin and wax may preferably be (0.5 to 1):(1 to 4). If the ratio is not within such a range, various problems may undesirably be posed as described above.

The temporary adhesive layer J comprising the above-mentioned components can be disposed on the surface of the transfer-receiving material I, but a certain adhesiveness remains on the resultant printed matter. Accordingly, the adhesive layer may preferably be disposed on the surface of the ink layer 12 of the thermal transfer sheet. In such a case, since the adhesive is used in the form of an aqueous emulsion, the ink layer is not substantially impaired. The coating method or drying method for the emulsion is not particularly be restricted.

The temporary adhesive layer may preferably have a thickness of 0.1 to 10 $\mu$m, i.e., 0.1 to 5 g/m$^2$ in terms of coating amount of solid content.

The surface of the prepared temporary adhesive layer J has a minute unevenness due to embossing treatment. When such unevenness is formed, the adhesion strength may be regulated more easily.

EXPERIMENT EXAMPLE 4

The second embodiment of the present invention is specifically described with reference to Experiment Example. In the description appearing hereinafter, "parts" and "%" are those by weight unless otherwise noted specifically.

<Sample 1>

The following ink composition was applied onto the surface of a substrate film (the same as that used in Experiment Example 1) not provided with the slip layer so as to provide a coating amount of 4 $g/m^2$, thereby to form an ink layer.

Ink Composition

| | |
|---|---|
| Carbon black | 17 parts |
| Ethylene/vinyl acetate copolymer | 10 parts |
| Paraffin wax | 50 parts |
| Carnauba wax | 24 parts |

(The above-mentioned composition was prepared by melt-kneading the above components by means of an attritor at 120° C. for 4 hours).

Then, a temporary adhesive having the following composition (weight ratios were those shown in Table 5 appearing hereinafter) was applied onto the above-mentioned ink layer by a gravure coating method so as to provide a coating amount of 0.5 $g/m^2$ (after drying), thereby to prepare a thermal transfer sheet. Thereafter, plain paper (basis weight=64 $g/m^2$, Bekk surface smoothness=140 sec) was bonded to the thermal transfer sheet by nipping (nip temperature=50° C., nip pressure=500 kg), thereby to prepare a composite thermal transfer sheet according to the present invention.

Composition of Temporary Adhesive

| | |
|---|---|
| Acrylic adhesive resin dispersion (solid content = 40%, glass transition temperature = −58° C.) | 10 parts |
| Carnauba wax aqueous dispersion (solid content = 40%, melting point = 83° C.) | 15 parts |
| Water | 10 parts |
| Isopropanol | 30 parts |

Samples 2–3

Two species of composite thermal transfer sheets according to the present invention (Samples 2–3) were prepared in the same manner as in Sample 1 by using respective dispersions used in the preparation of Sample 1 except that the composition (weight ratios) of the temporary adhesive was changed to that shown in the following Table 6.

TABLE 6

| | Sample | | |
|---|---|---|---|
| Component | 1 | 2 | 3 |
| Adhesive resin | 2 | 1 | 1 |
| Wax | 3 | 3 | 1 |

Comparative Sample 1

A composite thermal transfer sheet of Comparative Example (Comparative Sample 1) was prepared in the same manner as in Sample 1 except that the adhesive particle dispersion used in Sample 1 was used for the temporary adhesive by itself.

Comparative Sample 2

A composite thermal transfer sheet of Comparative Example (Comparative Sample 2) was prepared in the same manner as in Sample 1 except that the adhesive particles and resin particles used in Sample 1 were used for the temporary adhesive in a weight ratio of 3:1.

Comparative Sample 3

A composite thermal transfer sheet of Comparative Example (Comparative Sample 3) was prepared in the same manner as in Sample 1 except that a temporary adhesive layer (thickness=0.5 $g/m^2$) was formed by using polyvinyl alcohol as a temporary adhesive.

Comparative Sample 4

A composite thermal transfer sheet of Comparative Example (Comparative Sample 4) was prepared in the same manner as in Sample 1 except that a temporary adhesive layer (thickness=0.5 $g/m^2$) was formed by using polyurethane-type adhesive as a temporary adhesive.

Then, the adhesions of the above-mentioned respective Samples and Comparative Samples to plain paper were measured. The results are shown in Table 7 appearing hereinafter.

The adhesion states are shown in Table 7 by using the following simbols ○ and x.

○: Two sheets were not easily peeled form each other even after standing. After printing operation, peeling was easily effected by using a fingertip while leaving no ground staining on the paper.

x: Peeling occurred spontaneously after standing, or ground staining, etc., occurred after printing operation.

Based on the above results, it has been found that an adhesion strength of 800–2000 g was preferred.

The adhesion strength between the temporary adhesive layer and the transfer-receiving material was measured by cutting a sample having a width of 25 mm and a length of 55 mm, and subjecting the sample to measurement by means of a surface friction tester (HEIDON-14, mfg. by Shinto Kagaku K.K.) at a pulling speed of 1800 mm/min.

The printer used for the evaluation in this instance was a A4-size thick film type thermal-head printer having a platen pressure of 20 kg (full width) wherein a greater stress was applied to the composite thermal transfer sheet at the time of conveyance thereof, etc., as compared with that in the printer used in Experiment Examples 1 to 3.

TABLE 7

| | Adhesion | Evaluation | |
|---|---|---|---|
| Sample 1 | 1200 | ○ | Good |
| Sample 2 | 800 | ○ | Good |
| Sample 3 | 1600 | ○ | Good |
| Comparative Sample 1 | above 2000 | X | Ink layer was transferred to the paper |
| Comparative Sample 2 | above 2000 | X | Resolution and ink cutting were poor |
| Comparative Sample 3 | Peeling was easily effected. Moisture resistance was poor.*1 | | |
| Comparative Sample 4 | Initial tackiness was great. Blocking occurred.*1 | | |

TABLE 7-continued

| Adhesion | Evaluation |
|---|---|

*1: The adhesion strength was not measured.

Next, a third embodiment of the present invention is described.

In the composite thermal transfer sheet according to the present invention as shown in FIG. 1, a hiding layer can be provided on at least one side of both sides of the substrate film 1. The hiding layer has a function of preventing the leak of secret such that the third party accesses to the contents of the resultant printed matter on the basis of while dropout or printing trace occurring in the thermal transfer sheet A after the printing operation.

Such a hiding layer may be disposed independently. Alternatively, a mat layer 3 to be disposed between the substrate film on the slip layer 4 to be disposed on the back surface of the substrate film is caused to have a hiding function, whereby such a layer also functions as a hiding layer. Further, a film having a vapor-deposited aluminum layer may be used as the substrate film, or the substrate film per se may be colored.

There is described a typical embodiment wherein the mat layer 3 is caused to have a color. Such a mat layer may be formed by applying onto the surface of a substrate film a coating liquid comprising an appropriate binder, a colorant (pigment, dye, metal powder, etc.), and organic or inorganic particles.

The binder is any of those such as polyester resin, polyvinyl butyral resin, polyacetal resin, cellulose resin, acrylic resin and urethane resin.

The particles to be used as a matting agent may be any of those including the above-mentioned colorant; inorganic particles such as silica, alumina, clay, and calcium carbonate; and plastic pigments such as acrylic resin particles, epoxy resin particles, and benzoguanamine resin particles.

It is preferred to use the above matting agent in an amount of 30 wt. % or smaller, more preferably 5 to 25 wt. %, particularly preferably 10 to 20 wt. %, based on the weight of the mat layer.

The mat layer may be formed by dissolving or dispersing the above-mentioned materials in an appropriate solvent such as acetone, methyl ethyl ketone, toluene and xylene, adding an optional crosslinking agent such as polyisocyanate as desired thereby to prepare a coating liquid, applying the resultant coating liquid by a known coating means such as gravure coater, roll coater, and wire bar coater, and then drying the resultant coating.

When the coating amount is 2.0 g/m$^2$ or smaller, preferably 0.1 to 1.0 g/m$^2$ (based on solid content), a colored mat layer having sufficient performances may be formed.

EXPERIMENT EXAMPLE 5

The third embodiment of the present invention is specifically described with reference to Experiment Example. In the description appearing hereinafter, "parts" and "%" are those by weight unless otherwise noted specifically.

<Sample 1>

A 6.0 $\mu$m-thick polyethylene terephthalate film was used as a substrate film, and a black ink for forming a heat-resistant slip layer having the following composition was applied onto one surface side thereof by a gravure coating method so as to provide a coating amount of 0.7 g/m$^2$ (after drying), and then dried, thereby to form a heat-resistant black slip layer.

Black Ink for Heat-Resistant Slip Layer

| | |
|---|---|
| Vinylidene fluoride resin (Kainer SL, mfd. by Pennwalt Co.) | 9 parts |
| Teflon powder (Hostafulon TF 9205, mfd. by Hoechst) | 8 parts |
| Acryl-polyol (TP-5000, mfd. by Denka Polymer K.K.) | 9 parts |
| Graft polymer wax (Marked C-113, mfd. by Adeka-Argus Co.) | 2 parts |
| Curing agent (Takenate D-110N, mfd. by Takeda Yakuhin Kogyo K.K.) | 10 parts |
| Carbon black (Seast S, mfd. by Tokai Denkyoku K.K.) | 8 parts |
| Methyl ethyl ketone | 40 parts |
| Toluene | 14 parts |

Then, the following ink composition was applied onto the surface of the above-mentioned substrate film not provided with the slip layer so as to provide a coating amount of 4 g/m$^2$, thereby to form an ink layer.

Ink Composition

| | |
|---|---|
| Carbon black | 15 parts |
| Ethylene/vinyl acetate copolymer | 8 parts |
| Paraffin wax | 50 parts |
| Carnauba wax | 25 parts |

(The above-mentioned composition was prepared by melt-kneading the above components by means of an attritor at 120° C. for 4 hours).

Then, a temporary adhesive having the following composition (weight ratios were those shown in Table 8 appearing hereinafter) was applied onto the above-mentioned ink layer by a gravure coating method so as to provide a coating amount of 0.5 g/m$^2$ (after drying), thereby to prepare a thermal transfer sheet. Thereafter, plain paper (basis weight=64 g/m$^2$, Bekk surface smoothness=140 sec, rigidity=45 gf/cm)) was bonded to the thermal transfer sheet by nipping (nip temperature=50° C., nip pressure=500 Kg), thereby to prepare a composite thermal transfer sheet (Sample 1) according to the present invention.

Composition of Temporary Adhesive

| | |
|---|---|
| Acrylic adhesive particle aqueous dispersion (solid content = 40%, glass transition temperature = −70° C., particle size = 3 to 10 $\mu$m) | 10 parts |
| Acrylic resin particle aqueous dispersion (solid content = 20%, glass transition temperature = 85° C., particle size = 0.2 to 0.5 $\mu$m) | 15 parts |
| Carnauba wax aqueous dispersion (solid content = 40%, melting point = 83° C.) | 15 parts |
| Water | 10 parts |
| Isopropanol | 30 parts |

<Samples 2–4>

A 6.0 $\mu$m-thick polyethylene terephthalate film was used as a substrate film, and a silver ink for forming a mat layer having the following composition was applied onto one surface side thereof by a gravure coating method so as to provide a coating amount of 1 g/m$^2$ (after drying), and then dried, thereby to form a heat-resistant silver mat layer.

Silver Ink for Mat Layer

| | |
|---|---|
| Aluminum paste (solid content = 80%) | 12 parts |
| Acryl-polyol | 14 parts |
| Vinyl chloride-vinylacetate copolymer resin | 5 parts |
| Polyisocyanate (solid content = 50%) | 5 parts |
| Methyl ethyl ketone | 40 parts |
| Toluene | 30 parts |

Three species of composite thermal transfer sheets according to the present invention (Samples 2 to 4) were prepared in the same manner as in Sample 1 by using respective dispersions used in the preparation of Sample 1 except that the composition (weight ratios) of the temporary adhesive was changed to that shown in the following Table 8

TABLE 8

| | Sample | | | |
|---|---|---|---|---|
| Component | 1 | 2 | 3 | 4 |
| Adhesive particles | 2 | 1 | 2 | 4 |
| Resin particles | 1.5 | 1 | 1 | 1 |
| Wax particles | 3 | 2 | 3 | 4 |

Comparative Sample 1

A composite thermal transfer sheet of Comparative Example (Comparative Sample 1) was prepared in the same manner as in Sample 1 except that a substrate film having a colorless slip layer was used as the substrate film instead of that used in Sample 1.

Comparative Sample 2

A composite thermal transfer sheet of Comparative Example (Comparative Sample 2) was prepared in the same manner as in Sample 1 except that the colored mat layer was not formed.

Then, each of the above-mentioned thermal transfer sheets of Samples 1 to 4 and Comparative Samples 1 to 2 was loaded to a printer and printing was effected. With respect to the Samples 1 to 4, no printing trace of white dropout was found. On the other hand, with respect to Comparative Samples 1 to 2, clear printing traces were found and the contents of the printed information could be read from the printing traces.

Then, a fourth embodiment of the composite thermal transfer sheet according to the present invention is described with reference to FIGS. 6 to 8.

Figure 6:
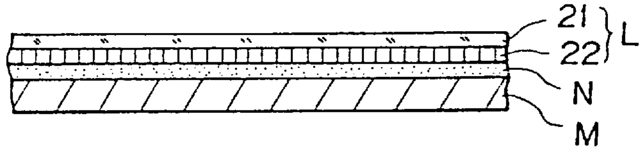
FIG. 6 is a schematic sectional view of a basic structure of another embodiment of the composite thermal transfer sheet according to the present invention.

FIG. 6 is a schematic partial sectional view showing the fourth embodiment of the composite thermal transfer sheet according to the present invention.

Referring to FIG. 6, the composite thermal transfer sheet according to the present invention comprises a thermal transfer film L and a transfer-receiving material M peelably bonded to the thermal transfer sheet L by means of a temporary (or provisional) adhesive layer N, wherein the transfer-receiving material M has a width which is substantially the same as that of the thermal transfer film L. The thermal transfer film L comprises a substrate film 21 and a heat-fusible ink layer 22 disposed thereon.

The composite thermal transfer sheet according to the present invention is characterized in that any of boundaries between respective layers, interiors thereof or surfaces thereof has been subjected to antistatic treatment.

Figure 7:
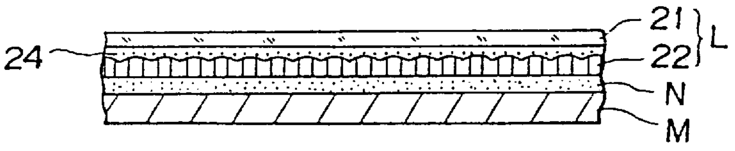
FIG. 7 is a schematic sectional view of an embodiment wherein an antistatic layer is disposed in the composite thermal transfer sheet shown in FIG. 6.

In an embodiment shown in FIG. 7, an antistatic layer 24 is formed between the substrate film 21 and the ink layer 22. When inorganic or organic particles are incorporated in the antistatic layer 24 so as to impart minute unevenness form to the surface thereof, the antistatic layer 24 also functions as a mat layer, whereby the thermal transfer sheet may provide legible printed letters having a matted surface.

Figure 8:
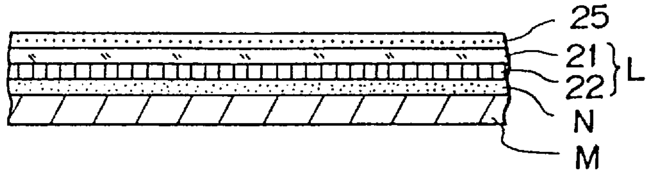
FIG. 8 is a schematic sectional view of another embodiment wherein an antistatic layer is disposed in the composite thermal transfer sheet shown in FIG. 6.

In an embodiment shown in FIG. 8, an antistatic layer 24 containing electroconductive carbon is formed on the surface of the substrate film 21. When heat-resistant particles, lubricant, release agent, etc., are further incorporated in the antistatic layer 24 so that the antistatic layer is imparted with an antistatic property, and further the occurrence of a hole in the substrate film due to a thermal head, sticking of the thermal head may be prevented.

Alternatively, effective antistatic effect can also be obtained by incorporating electro-conductive carbon in the ink layer 22 or the temporary adhesive layer N.

According to the above-mentioned method, problems caused by charging may be solved in a period of form the preparation to the use of the thermal transfer sheet, at the time of conveyance thereof in a printer, at the time of printing, and after the printing.

In the present invention, any of boundaries between respective layers, interiors thereof or surfaces thereof may be subjected to antistatic treatment, and the portion to be treated is not particularly limited. For example, there is described an embodiment wherein an electroconductive mat layer 24 is formed between the substrate film 21 and the ink layer 22, with reference to FIG. 7.

Such an electroconductive mat layer may be formed by applying onto the surface of a substrate film a coating liquid comprising an appropriate binder, carbon black, and organic or inorganic particles.

The binder is any of those such as polyester resin, polyvinyl butyral resin, polyacetal resin, cellulose resin, acrylic resin and urethane resin.

In the present invention, any of electroconductive carbons used in the prior art for electroconductive plastic or antistatic treatment of plastic, but porous electroconductive carbon black may preferably be used. For example, such a carbon black having a DBP oil absorption of 400 ml/100 g or larger (more preferably 450 to 600 ml/100 g) may preferably be used. Specific examples thereof may include those which are commercially available and sold under the name of Ketjen Black EC 600 JD, etc. When such porous electroconductive carbon is used, a sufficient antistatic property may be imparted by using a small amount thereof.

In the present invention, the above-mentioned electroconductive carbon may be used in an amount of 60 wt. % or below based on the weight of the mat later. However, when the above-mentioned porous electroconductive carbon is used, better effect may be obtained by using a smaller amount thereof.

The particles to be used as a matting agent may be any of those including the above-mentioned carbon black; inorganic particles such as silica, alumina, clay, and calcium carbonate; and plastic pigments such as acrylic resin particles, epoxy resin particles, and benzoguanamine resin particles.

It is preferred to use the above matting agent in an amount of 30 wt. % or smaller, more preferably 5 to 25 wt. %, particularly preferably 10 to 20 wt. %, based on the weight of the mat layer.

The electroconductive mat layer may be formed by dissolving or dispersing the above-mentioned materials in an appropriate solvent such as acetone, methyl ethyl ketone, toluene and xylene, adding an optional crosslinking agent such as polyisocyanate as desired thereby to prepare a coating liquid, applying the resultant coating liquid by a known coating means such as gravure coater, roll coater, and wire bar coater, and then drying the resultant coating.

When the coating amount is 2.0 g/m$^2$ or smaller, preferably 0.1 to 1.0 g/m$^2$ (based on solid content), an antistatic mat layer having sufficient performances may be formed.

The substrate film 21, heat-fusible ink layer 22, transfer-receiving material M and temporary adhesive layer N constituting the composite thermal transfer sheet in this instance respectively correspond to the substrate film 1, heat-fusible ink layer 2, transfer-receiving material B and temporary adhesive layer C used in Example 1 and temporary adhesive layer J used in Example 2. Accordingly, the explanation of these member are omitted.

EXPERIMENT EXAMPLE 6

The fourth embodiment of the present invention is specifically described with reference to Experiment Example. In the description appearing hereinafter, "parts" and "%" are those by weight unless otherwise noted specifically.

<Sample 1>

A substrate film which was the same as that used in Experiment Example 1 was used, and an ink for antistatic mat layer having the following composition was applied onto one surface side thereof not provided with the slip layer so as to provide a coating amount of 0.5 g/m$^2$ (based ion solid content) and then dried, thereby to form an antistatic mat layer.

Ink Composition for Antistatic Mat Layer

| | |
|---|---|
| Carbon black | 10 parts |
| Polyester resin | 5 parts |
| CPA resin | 5 parts |
| Methyl ethyl ketone | 40 parts |
| Toluene | 40 parts |

Next, the following ink composition was applied onto the surface of the above-mentioned antistatic mat layer so as to provide a coating amount of 4 g/m$^2$, thereby to form an ink layer.

Ink Composition

| | |
|---|---|
| Carbon black | 15 parts |
| Ethylene/vinyl acetate copolymer | 8 parts |
| Paraffin wax | 50 parts |
| Carnauba wax | 25 parts |

(The above-mentioned composition was prepared by melt-kneading the above components by means of an attritor at 120° C. for 4 hours).

Then, a temporary adhesive having the following composition was applied onto the above-mentioned ink layer by a gravure coating method so as to provide a coating amount of 0.5 g/m$^2$ (after drying), thereby to form a temporary adhesive layer.

Composition of Temporary Adhesive

| | |
|---|---|
| Acrylic adhesive particle aqueous dispersion (solid content = 40%, glass transition temperature = −70° C., particle size = 3 to 10 μm) | 10 parts |
| Acrylic resin particle aqueous dispersion (solid content = 20%, glass transition temperature = 85° C., particle size = 0.2 to 0.5 μm) | 15 parts |
| Carnauba wax aqueous dispersion (solid content = 40%, melting point = 83° C.) | 15 parts |
| Water | 10 parts |
| Isopropanol | 30 parts |

Thereafter, plain paper (basis weight=64 g/m$^2$, Bekk surface smoothness=140 sec) was bonded to the thermal transfer sheet prepared above by nipping (nip temperature=50° C., nip pressure=500 kg), and then wound into a roll form thereby to prepare a composite thermal transfer sheet (Sample 1) according to the present invention.

Sample 2

A composite thermal transfer sheet according to the present invnetion (Sample 2) was prepared in the same manner as in Sample 1 except for using an ink composition having the following composition for antistatic mat layer instead of that used in Sample 1.

Ink Composition for Antistatic Mat Layer

| | |
|---|---|
| Carbon black (Ketjen Black EC 600DJ) | 2 parts |
| Melamine resin powder (Eposter S) | 5 parts |
| Polyester resin | 5 parts |
| CPA resin | 8 parts |
| Methyl ethyl ketone | 40 parts |
| Toluene | 40 parts |

Sample 3

A composite thermal transfer sheet according to the present invention (Sample 3) was prepared in the same manner as in Sample 1 except for using an ink composition having the following composition for electroconductive ink layer instead of the formation of the antistatic mat layer used in Sample 1.

Electroconductive Ink Composition

| | |
|---|---|
| Carbon black (Ketjen Black EC 600DJ) | 20 parts |
| Ethylene-vinyl acetate resin | 10 parts |
| Paraffin wax | 50 parts |
| Carnauba wax | 20 parts |

Sample 4

A composite thermal transfer sheet according to the present invention (Sample 4) was prepared in the same manner as in Sample 1 except for using an ink composition having the following composition for electroconductive temporary adhesive layer instead of the formation of the antistatic mat later used in Sample 1.

Composition of Temporary Electroconductive Adhesive

| | |
|---|---|
| Carbon black aqueous dispersion (solid content = 30%) | 15 parts |
| Acrylic adhesive particle aqueous dispersion (solid content = 40%) | 10 parts |
| Acrylic resin particle aqueous dispersion (solid content = 20%) | 5 parts |
| Carnauba wax aqueous dispersion (solid content = 40%) | 10 parts |
| Water | 10 parts |
| Isopropyl alcohol | 30 parts |

Comparative Sample 1

A composite thermal transfer sheet of Comparative Example (Comparative Sample 1) was prepared in the same manner as in Sample 1 except that the antistatic mat layer was not formed.

When charging amounts of the above-mentioned Samples 1 to 4 and Comparative Sample 1 were measured at 23° C. and 60% RH, the following results were obtained. Further, after printing operation was effected, the clinging of the thermal transfer film was investigated. The results are shown in the following Table 9.

TABLE 9

| | Charging amount | Clinging of film |
|---|---|---|
| Sample 1 | 0.02 | None |
| Sample 2 | 0.02 | None |
| Sample 3 | 0.02 | None |
| Sample 4 | 0.02 | None |
| Comparative Sample | 20.0 | Observed |

As described above, in the composite thermal transfer sheet according to the present invention, problems caused by electrification occurring at the time of printing and after printing have been solved.

Then, a fifth embodiment of the composite thermal transfer sheet according to the present invention is described with reference to FIGS. 9 to 10.

Figure 9:
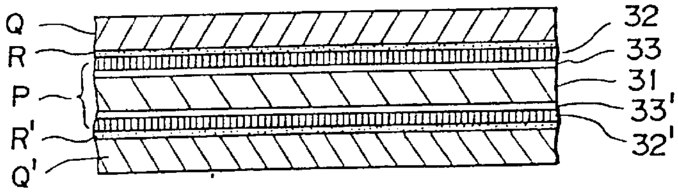
FIG. 9 is a schematic sectional view of another embodiment of the composite thermal transfer sheet according to the present invention.

FIG. 9 is a schematic view showing the fifth embodiment of the composite thermal transfer sheet according to the present invention.

Referring to FIG. 9, the composite thermal transfer sheet according to the present invention comprises a thermal transfer sheet P comprising a substrate film 31 and ink layers 32 and 32' disposed on the both sides of the substrate film 31; and two sheets of transfer-receiving materials Q and Q' peelably bonded to the thermal transfer sheet P by means of temporary (or provisional) adhesive layers R and R'.

Figure 10:
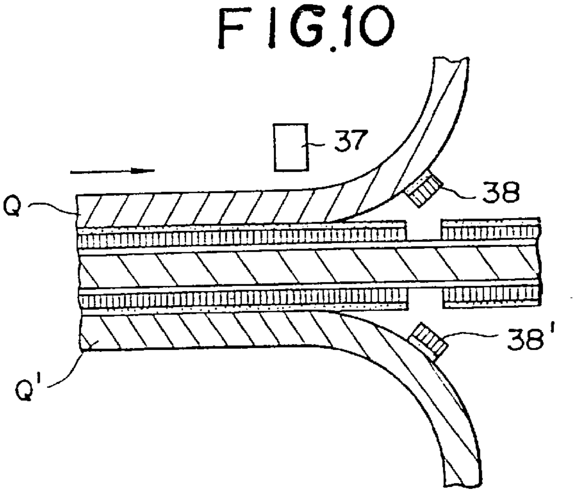
FIG. 10 is a schematic sectional view of a printing state of the composite thermal transfer sheet shown in FIG. 9.
Figure 11:
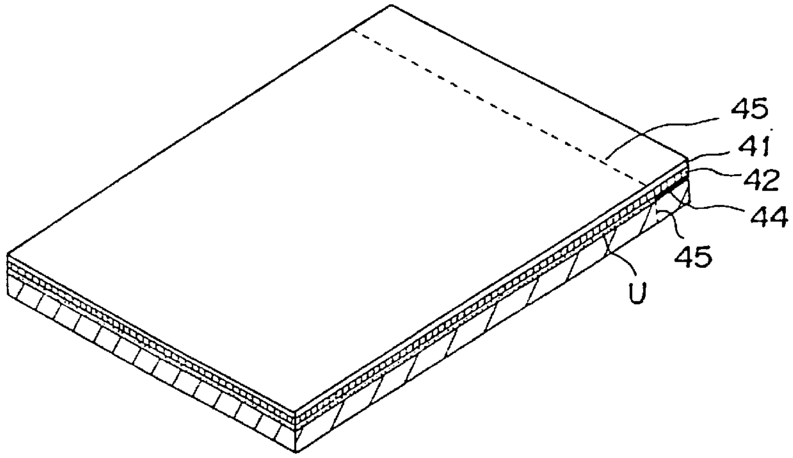
FIG. 11 is a schematic perspective view of an embodiment of a sheet-type composite thermal transfer sheet according to the present invention.
Figure 12:
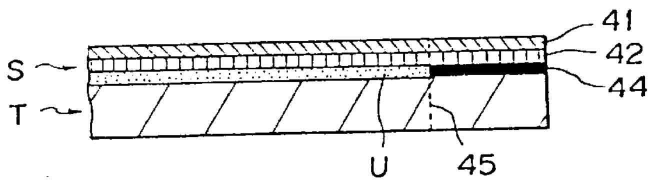
FIG. 12 is a partial schematic sectional view of the composite thermal transfer sheet shown in FIG. 11.

For example, when the above-mentioned composite thermal transfer sheet according to the present invention is set to a facsimile printer, is conveyed as indicated by the allow shown in FIG. 10, printing is effected by means of a thermal head 37 and transfer-receiving materials Q and Q' are peeled therefrom, desired images 38 and 38' may be formed on the transfer-receiving materials Q and Q', respectively.

As described above, when heat-fusible ink layers are formed on both sides of a substrate film and a transfer-receiving material to peelably bonded to each of the ink layers by a temporary adhesive layer, two printed matters may be obtained corresponding to one printing operation.

The transfer-receiving materials Q and Q' may be in a sheet or film form usable for thermal transfer printing. Specific examples of such a transfer-receiving material may include wood-free paper, plain paper, synthetic paper, tracing paper, plastic film, etc. In a case where letters or marks were printed on the transfer-receiving materials, however, since the letters or marks printed on the transfer-receiving material Q constitute mirror image, the transfer-receiving material Q may preferably by a transparent material such as a transparent plastic film. On the other hand, in a case where images such as landscape were printed, the formation of mirror image will be allowed, so a opaque transfer-receiving material may be usable. The transfer-receiving materials Q and Q' may be in a sheet form of A-size or B-size, or a continuous sheet having arbitrary width.

The substrate film 31, heat-fusible ink layer 32 and 32, and temporary adhesive layers R and R' constituting the composite thermal transfer sheet as shown in FIG. 9 respectively correspond to the substrate film 1, heat-fusible ink layer 2, and temporary adhesive layer C used in Example 1 and temporary adhesive layer J used in Example 2. Accordingly, the explanation of these members are omitted.

Then a sixth embodiment of the composite thermal transfer sheet according to the present invention is described with reference to FIGS. 11 to 16.

In such an embodiment, the composite thermal transfer sheet is a sheet-type. In the specific examples shown in FIG. 11 and FIG. 12, i.e., a partial sectional view of FIG. 11, the composite thermal transfer sheet comprises a sheet-type thermal transfer sheet S comprising a substrate film 41 and a heat-fusible ink layer 42 disposed on one surface side thereof; and a transfer-receiving material T which has substantially the same size as that of the thermal transfer sheet S and is peelably bonded thereto by means of a temporary adhesive layer U. In such an embodiment, the above-mentioned thermal transfer sheet S is fixed to the transfer-receiving material T at a fixing portion 44 disposed on at least one of both ends, and notches are formed near to the fixing portion 44.

The above fixing portion 44 has a greater adhesive strength than that of the temporary adhesive layer U. Such a fixing portion may be formed by applying another strong adhesive or a relatively larger amount of the above-mentioned temporary adhesive onto a predetermined portion of the thermal transfer sheet S and/or the transfer-receiving material T at the time of the formation of a continuous sheet-type composite thermal transfer sheet so as to provide coated portions disposed at equal intervals, bonding both of them to each other, and then cutting the resultant laminate into a desired size.

In this instance, another adhesive or a larger amount of the temporary adhesive is used. However, it is also possible to selectively heat-seal the fixing portion 44 by means of a hot press, etc., to strengthen the adhesion of the temporary adhesive layer, thereby to form the fixing portion 44. As a matter of course, such a fixing portion may also be formed on two, three or four sides of the composite thermal transfer sheet.

Since the thermal transfer sheet S is firmly bonded to the transfer-receiving material T in the above-mentioned fixing portion 44, when both of these members are peeled from each other after printing operation, the ink layer 42 of the thermal transfer sheet S is transferred to the transfer-receiving material T, whereby the resultant transferred ink layer remains on the transfer-receiving material T as staining. However, when the above notches are formed, since the fixing portion 44 of the thermal transfer sheet S and the transfer-receiving material T is separated of the basis of the notches, whereby the above-mentioned inconvenience may be solved.

Figure 13:
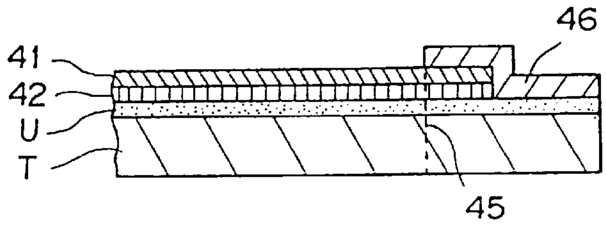
FIGS. 13 and 14 are schematic sectional views each showing another embodiment of a sheet-type composite thermal transfer sheet.

FIG. 13 shows an embodiment of the composite thermal transfer sheet wherein one side is fixed by means of an adhesive tape 46.

Figure 14:
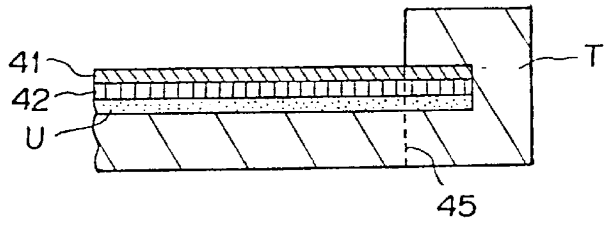

FIG. 14 shows an embodiment wherein the thermal transfer sheet S is fixed by folding back the transfer-receiving material T.

Figure 15:
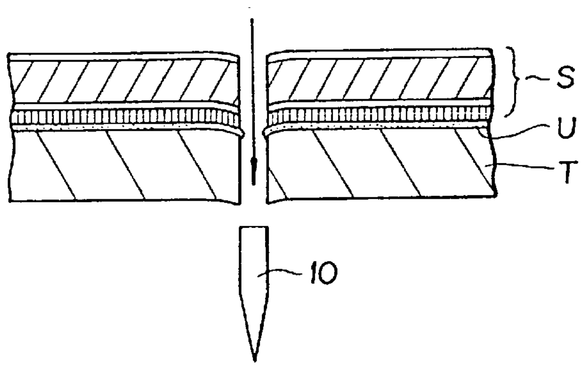
FIG. 15 is a schematic sectional view showing a method of cutting a composite thermal transfer sheet.

FIG. 15 shows a schematic sectional view of the cut end portion of a sheet-type composite thermal transfer sheet prepared by cutting a continuous sheet-type composite thermal transfer sheet. Referring to FIG. 15, in the case of cutting of the continuous sheet, when a cutter 10 is driven from the thermal transfer sheet S side, the end portion of the temporary adhesive layer U of the thermal transfer sheet S is pressed to the transfer-receiving material T, and the end portion of the temporary adhesive layer U is more firmly bonded to the transfer-receiving material T. Microscopically, the temporary adhesive layer U slightly penetrates into the cut surface of the transfer-receiving material T, whereby the adhesion strength of the end portion is enhanced. As a matter of course, the above-mentioned adhesion strength is greater than that in the other portion, but is not so great as to transfer the ink layer to the transfer-receiving material T at the time of peeling. Accordingly, at the time of paper feeding, the end portion is not easily peeled so as to turn over.

The sheet-type composite thermal transfer sheet is not restricted to the above-mentioned embodiment. For example, there can also be used a method wherein at least one of the end portions of the sheet-type composite thermal transfer sheet is fixed by any of other means such as stapler.

The substrate film 41, heat-fusible ink layer 42, transfer-receiving material T and temporary adhesive layer U constituting the composite thermal transfer sheet in this instance respectively correspond to the substrate film 1, heat-fusible ink layer 2, transfer-receiving material B and temporary adhesive layer C used in Example 1 and temporary adhesive layer J used in Example 2. Accordingly, the explanation of these members are omitted.

In the above-mentioned sheet-type composite thermal transfer sheet, when a large number of such sheets are housed in a paper feed cassette and are fed to a printer one by one, friction between the sheets is strong and plural sheets can simultaneously be fed to the printer. In order to solve such a problem, it is effective that the adhesion strength between the thermal transfer sheet S and the transfer-receiving material T is stronger than the friction between the back surface of the substrate film 41 and the back surface of the transfer-receiving material T. More specifically, the adhesion between the thermal transfer sheet S and the transfer-receiving material T may preferably be 300 g or larger. Such an adhesive strength may be measured by cutting a sample having a width of 25 mm and a length of 55 mm, and subjecting the sample to measurement by means of a sliding friction meter (HEIDON-14, mfd. by Shinto Kagaku K.K.) at a pulling speed of 1800 mm/min. In a case where such an adhesive strength is attained, when the thermal transfer sheet is fed from a cassette, the peeling thereof can effectively be prevented in spite of the friction between sheets.

If the adhesive strength is below the above range, the adhesive strength between the thermal transfer sheet and the transfer-receiving material is insufficient. Accordingly, such an adhesion sometimes becomes weaker than the friction between sheets at the time of one by one feeding from the cassette, both of these members are liable to be peeled from each other, and the thermal transfer sheet liable to be wrinkled. In the present invention, the upper limit of the adhesion strength may appropriately be set within a range thereof wherein the contamination of the transfer-receiving material does not occur.

In the case of the above-sheet-type, when the transfer-receiving material T is paper, a problem of hygroscopicity can occur. More specifically, there can be posed a problem such that the composite thermal transfer sheet is curled due to hygroscopicity based on a change in humidity, and catch thereof in a printer becomes poor.

Figure 16:
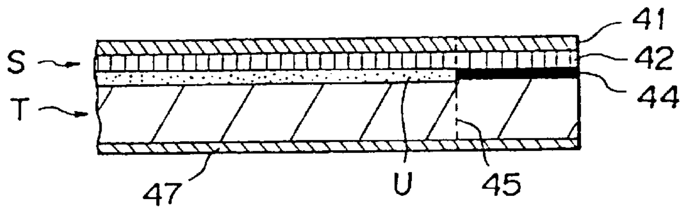
FIG. 16 is a schematic sectional view of another embodiment of a sheet-type composite thermal transfer sheet.

As one of the methods of solving such a problem, it is possible to dispose a curl prevention layer 47 on the surface of the transfer-receiving material T, as shown in FIG. 16. Such a curl prevention layer 47 has a unction of suppressing a change in moisture of paper as a transfer-receiving material regardless of an environmental humidity change.

In a preferred embodiment, the curl prevention layer is (1) one having a water-retaining property, or (2) one having a sealing property.

The water-retaining curl prevention layer may preferably be one prepared from a hydrophilic resinous liquid such as polyethylene glycol, polypropylene glycol, polyvinyl alcohol, polyvinyl pyrrolidone, polyacrylic acid, polymethacrylic acid, starch, cationic starch, etc. The curl prevention layer comprising a hydrophobic resin can also be formed by using a resinous liquid comprising hydrophilic material such as the above-mentioned hydrophilic resin, mono- or poly-propylene glycol, glycerin, pentaerythritol, highly water-absorbing resin, silica gel, highly hydrated inorganic salt, various surfactants, etc.

Since such a layer has a great water-retaining property and constantly adsorbs therein a certain amount of moisture, it is capable of suppressing a moisture change in the transfer-receiving material per se, whereby curl of the composite thermal transfer sheet can be prevented.

The curl prevention layer having a sealing property may be formed form a hydrophobic resinous liquid such as polyester resin, acrylic resin, polyurethane resin, polyamide resin, polyvinyl acetate resin, polyvinyl chloride resin, binders for various printing inks, etc. Since such a layer has an excellent sealing property, it is capable of effectively suppressing a change in the moisture content of the transfer-receiving material even when environmental humidity changes. Accordingly, Such a layer can similarly prevent the curl of the composite thermal transfer sheet.

The above-mentioned curl prevention layer may easily be formed on the surface of the transfer-receiving material by a known coating method before or after it is bonded to the thermal transfer sheet. When such a layer has a thickness of about 0.5 to 5 $\mu$m, sufficient effect may be obtained.

As one of the method of solving the above-mentioned problem of curl, there may be used a method wherein the composite thermal transfer sheet is housed in a bag-like container imparted with moisture resistance.

The materials constituting the container imparted with moisture resistance may include a laminate of paper and a resin film, paper coated with a resin, or an aluminum-deposited resin film. Alternatively, there may be used various methods including; a method wherein a moisture-absorbing sheet coated with or containing therein a moisture-absorbing agent such as water-absorbing resin, calcium chloride and silica gel is sealed a container bag simultaneously with the composite thermal transfer sheet; a method wherein the inner surface of a bag is coated with a moisture-absorbing paint comprising the above-mentioned moisture-absorbing agent; a method wherein a bag is caused to have a dual or laminate structure, and a plurality of package of the composite thermal transfer sheet is housed in the larger bag; a method wherein a so-called "lami-tip" is provided at the opening of a bag, and a desired number of sheets are taken out from the bag and the remainder sheets are sealed in the bag, a method wherein an adhesive layer for turning-over adhesion is provided near the opening of a bag, a desired number of sheets are used, and thereafter the remainder is sealed in the bag; etc.

EXPERIMENT EXAMPLE 7

The sixth embodiment of the present invention is specifically described with reference to Experiment Examples 7 and 8. In the description appearing hereinafter, "parts" and "%" are those by weight unless otherwise noted specifically.

Sample 1

The following ink composition was applied onto the surface of a substrate film (the same as in Experiment Example 1) not provided with the slip layer so as to provide a coating amount of 4 $g/m^2$, thereby to form an ink layer.

Ink Composition

| | |
|---|---|
| Carbon black | 15 parts |
| Ethylene/vinyl acetate copolymer | 8 parts |
| Paraffin wax | 50 parts |
| Carnauba wax | 25 parts |

(The above-mentioned composition was prepared by melt-kneading the above components by means of an attritor at 120° C. for 4 hours.)

Then, a temporary adhesive having the following composition was applied onto the above-mentioned ink layer by a gravure coating method so as to provide a coating amount of 0.5 $g/m^2$ (after drying), thereby to prepare a thermal transfer sheet. Thereafter, an acrylic adhesive was applied onto a front surface of plain paper (basis weight=64 $g/m^2$, Bekk surface smoothness=140 sec) so as to provide 10 mm-wide adhesive layer disposed at an equal interval of 30 cm. And then, the plain paper was bonded to the thermal transfer sheet by nipping (nip temperature=50° C., nip pressure=500 kg), thereby to prepare a continuous sheet-type composite thermal transfer sheet according to the present invention.

Composition of Temporary Adhesive

| | |
|---|---|
| Acrylic adhesive particle aqueous dispersion (solid content = 40%, glass transition temperature = −70° C.) | 10 parts |
| Acrylic resin particle aqueous dispersion (solid content = 20%, glass transition (temperature = −85° C., particle size = 0.2 to 0.5 μm) | 15 parts |
| Carnauba wax aqueous dispersion (solid content = 40%, melting point = 83° C.) | 15 parts |
| Water | 10 parts |
| Isopropanol | 30 parts |

Then, notches were formed on the thus obtained continuous sheet-type composite thermal transfer sheet at the both ends of the above-mentioned 10 mm-wide adhesive layer, and the resultant thermal transfer sheet was cut at the center of the 10 mm-wide adhesive layer, whereby a sheet-type composite thermal transfer sheet (Sample 1) according to the present invention wherein both ends thereof were fixed.

Since the above-mentioned composite thermal transfer sheet was sufficiently fixed at both ends, peeling did not occur during the handling thereof, and the thermal transfer sheet did not deviate from the paper at the time of printing. Further, when the end portion was cut after the printing by using the two sets of notches and the thermal transfer sheet was intended to be peeled from the paper, the peeling was easily effected.

EXPERIMENT EXAMPLE 8

Sample 1

The following ink composition was applied onto the surface of a substrate film (the same as in Experiment Example 1) not provided with the slip layer so as to provide a coating amount of 4 $g/m^2$, thereby to form an ink layer.

Ink Composition

| | |
|---|---|
| Carbon black | 15 parts |
| Ethylene/vinyl acetate copolymer | 8 parts |
| Paraffin wax | 50 parts |
| Carnauba wax | 25 parts |

(The above-mentioned composition was prepared by melt-kneading the above components by means of an attritor at 120° C. for 4 hours).

Then, a temporary adhesive having the following composition (weight ratios were those shown in Table 11 appearing hereinafter) was applied onto the above-mentioned ink layer by a gravure coating method so as to provide a coating amount of 0.5 $g/m^2$ (after drying), thereby to prepare a thermal transfer sheet. Thereafter, plain paper which had been provided with a 1 μm-thick curl prevention layer on the back surface thereof by using an aqueous polyethylene glycol solution, (basis weight=64 $g/m^2$, Bekk surface smoothness=140 sec, rigidity=50) was bonded to the thermal transfer sheet by nipping (nip temperature=50° C., nip pressure=500 kg), and then cut into A-4 size thereby to prepare a sheet-type composite thermal transfer sheet (Sample 1) according to the present invention.

Composition of Temporary Adhesive

| | |
|---|---|
| Acrylic adhesive particle aqueous dispersion (solid content = 40%, glass transition temperature = −70° C., particle size = 3 to 10 μm) | 10 parts |
| Acrylic resin particle aqueous dispersion (solid content = 20%, glass transition temperature = 85° C., particle size = 0.2 to 0.5 μm) | 15 parts |
| Carnauba wax aqueous dispersion (solid content = 40%, melting point = 83° C.) | 15 parts |
| Water | 10 parts |
| Isopropanol | 30 parts |

Samples 2–4

Three species of sheet-type composite thermal transfer sheets according to the present invention (Samples 2–4) were prepared in the same manner as in Sample 1 by using respective dispersions used in the preparation of Sample 1 except that a transfer-receiving material obtained by forming a curl prevention layer on the same plain paper as that used in Sample 1 by using the following composition shown in Table 10, and the composition (weight ratios) of the temporary adhesive was changed to that shown in the following Table 11.

TABLE 10

| Sample | Curl prevention layer | Thickness |
|---|---|---|
| 2 | Cationic starch | 1 μm |
| 3 | Polyvinylidene chloride | 1 μm |
| 4 | Acrylic emulsion containing cationic surfactant | 2 μm |

TABLE 11

| | Sample | | | |
|---|---|---|---|---|
| Component | 1 | 2 | 3 | 4 |
| Adhesive particles | 2 | 1 | 2 | 4 |
| Resin particles | 1.5 | 1 | 1 | 1 |
| Wax particles | 3 | 2 | 3 | 4 |

Comparative Sample 1

A sheet-type composite thermal transfer sheet of Comparative Example (Comparative Sample 1) was prepared in the same manner as in Sample 1 except that the same plain paper having no curl prevention layer was used as the transfer receiving material.

Then, the above-mentioned Samples 1–4 and Comparative Sample 1 were left standing for 30 min. under an atmosphere of 25° C. and 15% RH, and further left standing for 30 min. under an atmosphere of 25° C. and 90% RH. As a result, the Samples showed slight curl but the Comparative Sample showed considerable curl corresponding to the humidity change.

Next, a seventh embodiment of the composite thermal transfer sheet according to the present invention is described with reference to FIGS. 17 to 26.

Figure 17:
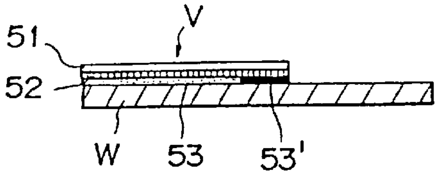
FIGS. 17 and 18 are schematic sectional views each showing another embodiment of a co-winding type composite thermal transfer sheet.
Figure 18:
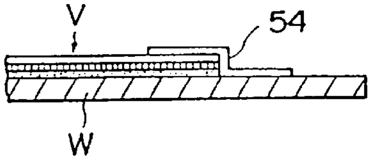
Figure 19:
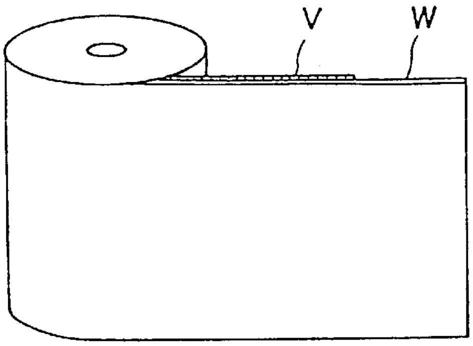
FIG. 19 is a schematic perspective view showing a state obtained by winding the co-winding type composite thermal transfer sheet shown in FIG. 17 or FIG. 18 into a roll form.

The composite thermal transfer sheet in such an embodiment is a co-winding type. Referring to FIG. 17, a schematic partial view, the composite thermal transfer sheet comprises a thermal transfer sheet film comprising a substrate film 51 and a heat-fusible ink layer 52 disposed on one surface thereof; and a transfer-receiving material which has substantially the same width as that of the thermal transfer film and to peelably bonded thereto by means of a temporary adhesive layer 53, wherein both of these members are wound into a roll form as shown in FIG. 19. The composite thermal transfer sheet is characterized in that end portions of both of the above-mentioned members are fixed as shown in FIGS. 17 and 18.

Figure 20:
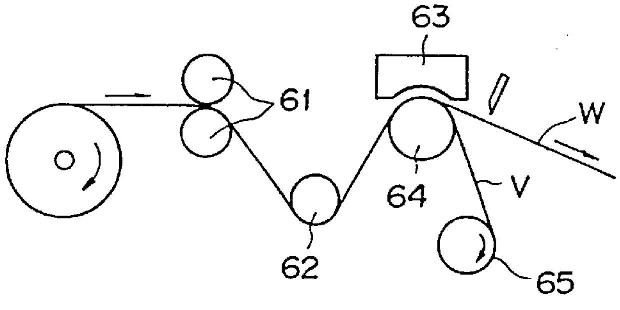
FIG. 20 is a schematic view for illustrating a state wherein printing is effected by using a composite thermal transfer sheet.

In a case where the end portions are fixed in such a manner, when the composite thermal transfer sheet is fed to a printer as shown in FIG. 20, it may prevent the occurrence of troubles such that the end portion thereof is peeled, bent or wrinkled while being conveyed to a paper-feeding roller 61, conveying roller 62, or a printing section comprising a thermal head 63 and a platen 64.

The object of the present invention may be attained by bonding the thermal transfer sheet V and the transfer-receiving material W having substantially the same length as the thermal transfer sheet V, by means of an adhesive, etc. In a preferred embodiment, however, as shown in FIGS. 17 to 19, the thermal transfer sheet V i the end portion is shortened, and the end portion of the thermal transfer sheet V is fixed to the transfer-receiving material W. In such an embodiment, the end portion of the transfer-receiving material W functions as a lead paper and therefore the provision of a special lead paper is unnecessary.

In an embodiment shown in FIG. 17, the end portion of the thermal transfer sheet V is fixed to the transfer-receiving material W by heat-sealing. In such an embodiment, since the temporary adhesive layer 53 is disposed between the thermal transfer sheet V and the transfer-receiving material W, these two members may be fixed to each other only by pressing the end portion 53' under heating. It is also possible to effect the fixing by using another adhesive or by engaging these two members by means of a so-called "clip-less", etc.

An embodiment shown in FIG. 18 is another preferred embodiment wherein the thermal transfer sheet V is fixed to the transfer-receiving material W by means of an ordinary adhesive tape 54. In such an embodiment, when the thermal transfer sheet is fed to a printer as shown in FIG. 20, the adhesive tape 54 may be peeled after the feeding operation and the used thermal transfer sheet V may easily be fixed to a winding-up roller 65 by using the adhesive tape 54.

Figures 21A, 21B, 21C:
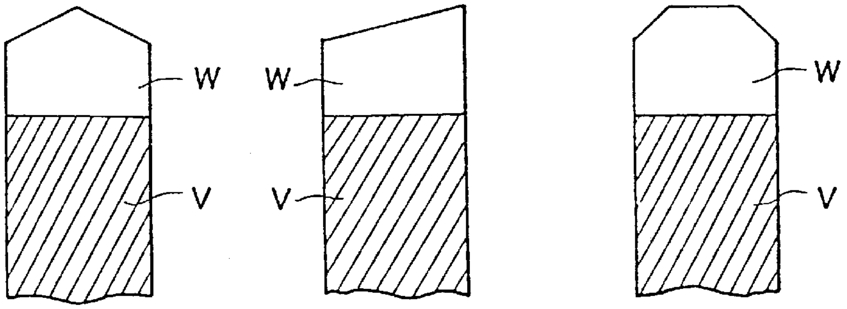
FIGS. 21(*a*) to 21(*c*) are schematic views each showing a shape of the end portion of a transfer-receiving material.

The shape of the end portion of the transfer-receiving material may be rectangular as shown in FIG. 19. However, when the end portion is narrowed as shown in FIGS. 21A, B or C, it may easily be inserted into the paper-feeding roller 61.

Figure 22:
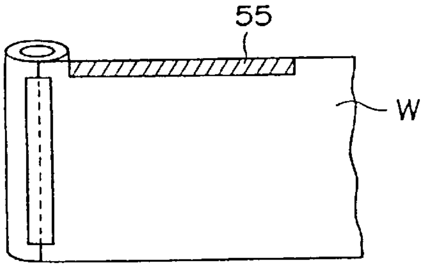
FIG. 22 is a schematic perspective view showing the end portion of a co-winding type composite thermal transfer sheet.
Figure 23:
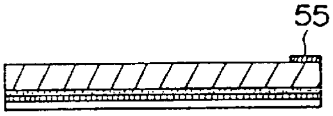
FIGS. 23 and 24 are schematic sectional views each showing the end portion of a co-winding type composite thermal transfer sheet.

In another preferred embodiment of the present invention as shown in FIG. 22 and FIG. 23, a schematic sectional view thereof, a detection mark 55 is formed on the surface of the transfer-receiving sheet W in the end portion thereof, whereby a trouble due to absence of the composite thermal transfer sheet is prevented.

The detection mark 55 may be provided corresponding to a detection means provided on a printer. More specifically, in a case where the detection means is one detecting reflection light, and the co-winding type composite thermal transfer sheet comprises, the thermal transfer sheet and the transfer-receiving material of white paper disposed thereon, a black detection mark 55 may, for example, be provided on the transfer-receiving material. Such a detection mark may arbitrarily formed by marking of a black stamp ink, by bonding of a black paper piece, or by cutting a portion of the transfer-receiving material to expose the black ink layer disposed below, etc.

The detection light emitted from a projector of the detection means is reflected by the white transfer-receiving material until it detects the detection mark, and the end portion of the co-winding composite thermal transfer sheet is not detected while the above reflection light is detected. When the detection light is projected to the black detection mark and is not reflected by the black detection mark, the detection means detects the end portion of the co-winding composite thermal transfer sheet, and the printer is prevented from printing the last page when the quantity of the information to be printed on the last page is smaller than that corresponding to one page.

In an embodiment wherein the co-winding composite thermal transfer sheet comprises the transfer-receiving material and the black thermal transfer sheet disposed thereon, the detection mark 55 may arbitrarily formed, e.g., by white printing, aluminum vapor deposition, bonding of aluminum foil, etc., or by cutting a portion of the black thermal transfer sheet to expose the while transfer-receiving material. In such an embodiment, when the detector detects reflection light, printer is prevented from printing the last page not reaching one page.

Figure 24:
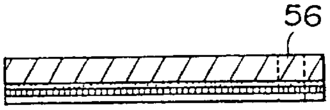

In an embodiment wherein the detection means detects transmission light, as shown in FIG. 24, a portion of the co-winding composite thermal transfer sheet near the end portion thereof is cut off to provide an appropriate opening 56 for transmission. When the detection light is detected on the opposite side of the co-winding composite thermal transfer sheet, the printer is similarly prevented from printing the next page.

In the above-mentioned embodiments, the end portion is optically detected. In a case where the end portion is detected by naked eyes, e.g., letters of "END" are stamped on a predetermined region to be observed with naked eyes.

Hereinabove, the present invention is described with reference to several embodiments. As a matter of course, the present invention is not restricted to these embodiments but the fixing of the end portion of the composite thermal transfer sheet can also be effected by another fixing method.

Figure 25:
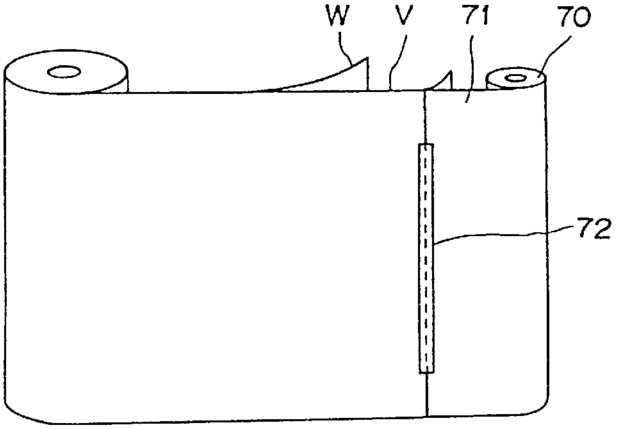
FIG. 25 is a schematic perspective view showing another embodiment of a co-winding type composite thermal transfer sheet.

In another embodiment shown in FIG. 25, the end portion of the thermal transfer sheet V of a co-winding composite thermal transfer sheet may be fixed to a tube for winding-up 70.

When the end portion of the thermal transfer sheet V is preliminarily fixed to the winding tube 70, only the printed transfer-receiving material is discharged from a printer after printing operation, whereby all the troubles due to used thermal transfer sheet may be obviated.

When the thermal transfer sheet V of the composite thermal transfer sheet in the end portion is fixed to the winding tube 70, a portion of the transfer-receiving material W in the end portion may be cut off to lengthen the thermal transfer material V, and the end portion may be fixed to the winding tube 70 by means of an adhesive tape, etc. It is also possible to preliminarily fix another film 71 to the winding tube 70 as shown in FIG. 25, and to fix the end portion of the film 71 to the thermal transfer film by means of an adhesive tape, etc.

The winding tube 70 to be used above may be a paper tube which has been used in a printer, etc., in the prior art, and the size, thereof, etc., may be adapted to the size of the printer.

Incidentally, the method of fixing the end portion to the winding tube can also be any of other known fixing methods.

Figure 26:
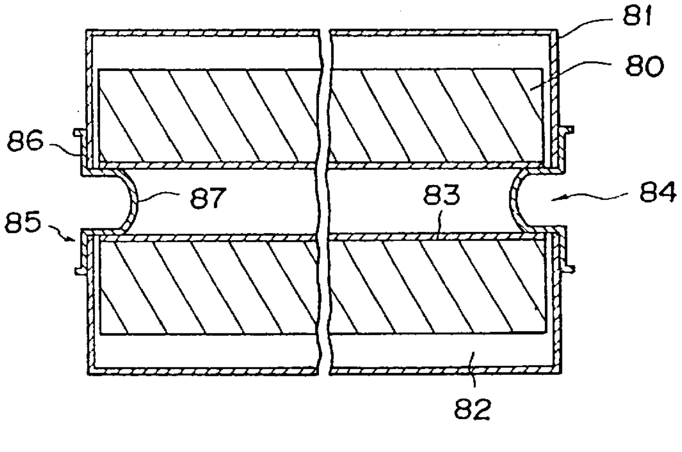
FIG. 26 is a schematic sectional view showing a package of an embodiment of a co-winding type composite thermal transfer sheet.

In another embodiment of the present invention, as shown in FIG. 26, a roll 80 of a co-winding type composite thermal transfer sheet is hung in an appropriate container 81 thereby to form a package. The container can be a wooden box, a metal box, a plastic box, etc., but may generally be a corrugated box. The shape of the corrugated container 81 may have a size capable of housing therein the above-mentioned roll 80 and retaining a certain space in the periphery thereof. For example, the roll 80 has a diameter of about 20 cm, the container 81 may preferably be a rectangular shape having an edge of about 21 to 25 cm.

In the present invention, it is preferred to form on the both ends of such a container 81 openings 84 having a diameter comparable to the inside diameter of the cylindrical member, i.e., the core 83 of the above-mentioned roll 80.

In the present invention, the roll 80 may be wrapped in a plastic sheet (not shown) as desired, housed in the above-mentioned container 81, and hung in the container 81 by means of a retention member 85.

As shown in the figure, the retention member 85 comprises a flange portion 86 and a projection 87 connected thereto, wherein the flange portion 86 has a larger diameter than that of the above-mentioned opening 84, and the projection 87 has a diameter such that it is capable of being inserted into the opening 84 of the container 81 and the inside diameter of the core 83 of the roll 80. When such a retention member 85 is inserted from the openings 84 disposed on both of the end portions of the container 81, into the core 83 of the roll 80 disposed therein, the roll 80 may be retained so that it does not contact any side of the interior of the container 81.

When a moisture-absorbing agent, etc., is disposed in the package according to the present invention as described above, the composite thermal transfer sheet may be prevented from absorbing moisture.

The substrate film 51, heat-fusible ink layer 52, transfer-receiving material W and temporary adhesive layer 53 constituting the composite thermal transfer sheet in this instance respectively correspond to the substrate film 1, heat-fusible ink layer 2, transfer-receiving material B and temporary adhesive layer C used in Example 1 and temporary adhesive layer J used in Example 2. Accordingly, the explanation of these members are omitted.

What is claimed is:

1. A composite thermal transfer sheet comprising: a thermal transfer sheet comprising a substrate film and a heat-fusible ink layer disposed on one surface side thereof and peelably bonded with a transfer-receiving material via a temporary adhesive layer which comprises a wax and an adhesive resin having a glass transition temperature of −90° C. to −58° C., wherein at least one surface of the substrate film, heat-fusible ink layer, temporary adhesive layer or transfer-receiving material has been subjected to an antistatic treatment.

2. A composite thermal transfer sheet according to claim 1, wherein an antistatic layer containing electroconductive carbon is disposed between the substrate film and the heat-fusible ink layer.

3. A composite thermal transfer sheet according to claim 2, wherein the electroconductive carbon is porous.

4. A composite thermal transfer sheet according to claim 1, wherein an antistatic layer containing electroconductive carbon is disposed opposite to the heat-fusible ink layer with respect to the substrate film.

5. A composite thermal transfer sheet according to claim 4, wherein the electroconductive carbon is porous.

6. A composite thermal transfer sheet according to claim 1, wherein the heat-fusible ink layer or the temporary adhesive layer contains electroconductive carbon.

7. A composite thermal transfer sheet according to claim 6, wherein the electroconductive carbon is porous.

8. A composite thermal transfer sheet according to claim 1, wherein a hiding layer for hiding the heat-fusible ink layer is formed on at least one surface of the substrate film.

9. A composite thermal transfer sheet according to claim 1, wherein the transfer-receiving material has a rigidity of 20 to 2500 gf/cm.

10. A composite thermal transfer sheet comprising: a thermal transfer sheet having two opposite end portions wherein said sheet comprises a substrate film and a heat-fusible ink layer disposed on one surface side thereof; a transfer-receiving material having substantially the same size as that of the thermal transfer sheet; and a temporary adhesive layer peelably bonding the heat-fusible ink layer of the thermal transfer sheet to the transfer-receiving material, wherein the temporary adhesive layer comprises a wax and an adhesive resin having a glass transition temperature of −90° C. to −58° C., wherein the thermal transfer sheet is fixed to the transfer-receiving material at a fixing portion which has a greater adhesive strength than the temporary adhesive layer on at least one of the end portions thereof and wherein at least one of the substrate film, heat-fusible ink layer, temporary adhesive layer or transfer-receiving material has been subjected to an antistatic treatment.

11. A composite thermal transfer sheet according to claim 10, wherein a hiding layer for hiding the heat-fusible ink layer is formed on at least one surface of the substrate film.

12. A composite thermal transfer sheet according to claim 10, wherein the transfer-receiving material has a curl prevention layer formed thereon.

13. A composite thermal transfer sheet according to claim 12, wherein the curl prevention layer has a water-retaining property.

14. A composite thermal transfer sheet according to claim 12, wherein the curl prevention layer has a sealing property.

* * * * *